US012804694B2

(12) United States Patent
Zhang et al.

(10) Patent No.: US 12,804,694 B2
(45) **Date of Patent: *Nov. 17, 2026**

(54) METHOD FOR REPORTING TERMINAL DEVICE CAPABILITY AND COMMUNICATIONS APPARATUS

(71) Applicant: HUAWEI TECHNOLOGIES CO., LTD., Shenzhen (CN)

(72) Inventors: Yongping Zhang, Beijing (CN); Baojin Li, Beijing (CN); Xiaohan Wang, Shanghai (CN); Huangping Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

This patent is subject to a terminal disclaimer.

(21) Appl. No.: 18/788,902

(22) Filed: Jul. 30, 2024

(65) Prior Publication Data

US 2025/0039914 A1 Jan. 30, 2025

Related U.S. Application Data

(63) Continuation of application No. 17/490,786, filed on Sep. 30, 2021, now Pat. No. 12,069,705, which is a (Continued)

(30) Foreign Application Priority Data

Mar. 30, 2019 (CN) ......................... 201910254188.5

(51) Int. Cl.
*H04W 72/54* (2023.01)
*H04B 7/06* (2006.01)
(Continued)

(52) U.S. Cl.
CPC .......... *H04W 72/54* (2023.01); *H04B 7/0626* (2013.01); *H04B 7/0639* (2013.01); *H04W 72/0453* (2013.01); *H04W 72/23* (2023.01)

(58) Field of Classification Search
CPC ... H04W 8/24; H04W 72/54; H04W 72/0453; H04W 72/23; H04W 72/51; H04B 7/0456; H04B 7/06; H04B 7/0626; H04B 7/0639
See application file for complete search history.

(56) References Cited

U.S. PATENT DOCUMENTS

2015/0117352 A1* 4/2015 Nammi .............. H04W 72/542 370/329
2018/0054290 A1 2/2018 Park et al.
(Continued)

FOREIGN PATENT DOCUMENTS

CN 101547433 A 9/2009
CN 107302425 A 10/2017
(Continued)

OTHER PUBLICATIONS

Samsung, "CSI enhancement for MU-MIMO," 3GPP TSG RAN WG1 meeting #96, R1-1902303, Athens, Greece, Feb. 25-Mar. 1, 2019, 9 pages.
(Continued)

*Primary Examiner* — Mehmood B. Khan
(74) *Attorney, Agent, or Firm* — Fish & Richardson P.C.

(57) ABSTRACT

This application provides a method for reporting a terminal device capability and a communications apparatus. The method includes: The terminal device generates first indication information and sends the first indication information to a network device. The first indication information is used to indicate one or more frequency domain parameters and one or more of the following capability parameters associated with each frequency domain parameter: a port quantity,
(Continued)

a spatial domain parameter, a reference signal resource quantity, and a total port quantity. The frequency domain parameter is used to indicate a maximum quantity of frequency domain units that can be supported by the terminal device. The frequency domain unit is a frequency domain unit based on which the terminal device feeds back a PMI. Each capability parameter group may be used to indicate one combination of a plurality of parameters that can be supported by the terminal device.

19 Claims, 7 Drawing Sheets

Related U.S. Application Data continuation of application No. PCT/CN2020/081528, filed on Mar. 27, 2020.

(51) Int. Cl.

| | |
|---|---|
| ***H04W 72/0453*** | (2023.01) |
| ***H04W 72/23*** | (2023.01) |

(56) References Cited

U.S. PATENT DOCUMENTS

| | | | | |
|---|---|---|---|---|
| 2018/0115357 | A1 * | 4/2018 | Park | H04B 7/0417 |
| 2018/0123654 | A1 | 5/2018 | Park et al. | |
| 2020/0092814 | A1 * | 3/2020 | Zhou | H04W 52/0235 |
| 2021/0359733 | A1 * | 11/2021 | Harrison | H04B 7/0486 |

FOREIGN PATENT DOCUMENTS

| | | | |
|---|---|---|---|
| CN | 107466446 | A | 12/2017 |
| CN | 107534540 | A | 1/2018 |
| CN | 108282255 | A | 7/2018 |
| CN | 108616346 | A | 10/2018 |
| WO | 2016126099 | A1 | 8/2016 |
| WO | 2018026241 | A1 | 2/2018 |
| WO | 2018059478 | A1 | 4/2018 |
| WO | 2018231812 | A1 | 12/2018 |

OTHER PUBLICATIONS

Office Action in Korean Appln. No. 10-2024-7020632, mailed on Oct. 30, 2024, 16 pages (with English translation).

3GPP TS 38.214 V15.4.0 (Dec. 2018), “3rd Generation Partnership Project; Technical Specification Group Radio Access Network;NR;Physical layer procedures for data(Release 15),” Dec. 2018, 102 pages.

3GPP TS 38.306 V15.4.0 (Dec. 2018), “3rd Generation Partnership Project; Technical Specification Group Radio Access Network;NR;User Equipment (UE) radio access capabilities(Release 15),” Dec. 2018, 40 pages.

3GPP TS 38.331 V15.4.0 (Dec. 2018), “3rd Generation Partnership Project; Technical Specification Group Radio Access Network;NR-;Radio Resource Control (RRC) protocol specification(Release 15),” Dec. 2018, 474 pages.

Extended European Search Report issued in European Application No. 20782106.7 on Apr. 4, 2022, 10 pages.

Huawei et al., “Discussion on CSI enhancement,” 3GPP TSG RAN WG1 #96bis, R1-1903969, Xi’an, China, Apr. 8-12, 2019, 19 pages.

Office Action in Japanese Appln. No. 2021-558000, dated Nov. 15, 2022, 5 pages (with English translation).

Office Action in Korean Appin. No. 10-2021-7034954, mailed on Jul. 19, 2023, 13 pages (with English translation).

Office Action issued in Chinese Application No. 201910254188.5 on Mar. 22, 2021, 20 pages (with English translation).

Office Action issued in Indian Application No. 202137049736 on Apr. 18, 2022, 6 pages.

PCT International Search Report and Written Opinion issued in International Application No. PCT/CN2020/081528 on Jun. 24, 2020, 16 pages (with English translation).

ZTE et al., “On RS and CSI report settings,” 3GPP TSG RAN WG1 NR Ad-Hoc Meeting, R1-1700128, Spokane, U.S.A., Jan. 16-20, 2017, 6 pages.

ZTE, “CSI Enhancement for MU-MIMO Support,” 3GPP TSG RAN WG1 #96, R1-1901633, Athens, Greece, Feb. 25-Mar. 1, 2019, 15 pages.

3GPP TS 38.214 V15.5.0, “3rd Generation Partnership Project; Technical Specification Group Radio Access Network; NR; Physical layer procedures for data (Release 15),” Mar. 2019, 103 pages.

3GPP TS 38.306 V15.4.0, “3rd Generation Partnership Project; Technical Specification Group Radio Access Network; NR; User Equipment (UE) radio access capabilities (Release 15),” Dec. 2018, 40 pages.

3GPP TS 38.331 V15.4.0, “3rd Generation Partnership Project; Technical Specification Group Radio Access Network; NR; Radio Resource Control (RRC) protocol specification (Release 15),” Dec. 2018, 474 pages.

* cited by examiner

METHOD FOR REPORTING TERMINAL DEVICE CAPABILITY AND COMMUNICATIONS APPARATUS

CROSS-REFERENCE TO RELATED APPLICATIONS

This application is a continuation of U.S. patent application Ser. No. 17/490,786, filed on Sep. 30, 2021, which is a continuation of International Application No. PCT/CN2020/081528, filed on Mar. 27, 2020, which claims priority to Chinese Patent Application No. 201910254188.5, filed on Mar. 30, 2019. All of the afore-mentioned patent applications are hereby incorporated by reference in their entireties.

TECHNICAL FIELD

This application relates to the wireless communications field, and more specifically, to a method for reporting a terminal device capability and a communications apparatus.

BACKGROUND

In a multiple input multiple output (multiple input multiple output, MIMO) technology, a spatial resource can be fully utilized, and a plurality of antennas are used at both a transmitter and a receiver, so that a system channel capacity can be multiplied without increasing spectrum resources. Therefore, the MIMO technology becomes a key technology in a fifth generation (5th generation, 5G) communications system.

To improve downlink transmission performance, a network device may send a reference signal to obtain channel state information (channel state information, CSI) of a downlink channel. Specifically, the network device may indicate, by using signaling, a terminal device to receive a reference signal based on a configured reference signal resource, perform downlink channel measurement based on the received reference signal, and report CSI by using a physical uplink resource configured by the network device. The terminal device needs to receive the reference signal based on the indication of the network device, to perform channel measurement and reporting.

However, when performing channel measurement and reporting, the terminal device needs to determine the CSI through a large amount of calculation. Therefore, when configuring, for the terminal device by using signaling, a related parameter used for channel measurement, the network device needs to perform configuration with reference to a capability of the terminal device. If the parameter configured by the network device is inappropriate, the terminal device may not have a processing capability and does not report the CSI. Consequently, the network device cannot obtain a real-time channel state, and system performance is affected.

SUMMARY

This application provides a method for reporting a terminal device capability and a communications apparatus, so that a network device configures a CSI measurement configuration parameter within a range of a capability of a terminal device, to obtain CSI fed back by the terminal device, thereby helping improve system performance.

According to a first aspect, a method for reporting a terminal device capability is provided. Specifically, the method includes: The terminal device generates first indication information, where the first indication information is used to indicate one or more frequency domain parameters and one or more of the following capability parameters associated with each frequency domain parameter: a port quantity, a spatial domain parameter, a reference signal resource quantity, and a total port quantity; each frequency domain parameter and the one or more capability parameters associated with the frequency domain parameter indicate one combination of a plurality of parameters simultaneously supported by the terminal device; the frequency domain parameter indicates a maximum quantity of first frequency domain units that is supported by the terminal device; the first frequency domain unit is a frequency domain unit based on which the terminal device reports a precoding matrix indicator PMI; the spatial domain parameter is a maximum quantity of spatial domain vectors that is supported by the terminal device; the spatial domain vector is used for codebook generation; the port quantity is a maximum quantity of ports in one reference signal resource across all carriers simultaneously that is supported by the terminal device; the reference signal resource quantity is a maximum quantity of reference signal resources across all the carriers simultaneously that can be supported by the terminal device; and the total port quantity indicates a total quantity of ports in all reference signal resources across all the carriers simultaneously that can be simultaneously supported by the terminal device. The terminal device sends the first indication information to a network device.

It should be understood that, the method provided in the first aspect may be performed by the terminal device, or may be performed by a chip disposed in the terminal device.

According to a second aspect, a method for reporting a terminal device capability is provided. Specifically, the method includes: A network device receives first indication information from a terminal device, where the first indication information is used to indicate one or more frequency domain parameters and one or more of the following capability parameters associated with each frequency domain parameter: a port quantity, a spatial domain parameter, a reference signal resource quantity, and a total port quantity; each frequency domain parameter and the one or more capability parameters associated with the frequency domain parameter indicate one combination of a plurality of parameters simultaneously supported by the terminal device; the frequency domain parameter indicates a maximum quantity of first frequency domain units that is supported by the terminal device; the first frequency domain unit is a frequency domain unit based on which the terminal device reports a precoding matrix indicator PMI; the spatial domain parameter is a maximum quantity of spatial domain vectors that is supported by the terminal device; the spatial domain vector is used for codebook generation; the port quantity is a maximum quantity of ports in one reference signal resource across all carriers simultaneously that is supported by the terminal device; the reference signal resource quantity is a maximum quantity of reference signal resources across all the carriers simultaneously that can be supported by the terminal device; and the total port quantity indicates a total quantity of ports in all reference signal resources across all the carriers simultaneously that can be simultaneously supported by the terminal device. The network device determines, based on the first indication information, the capability parameter supported by the terminal device.

It should be understood that, the method provided in the second aspect may be performed by the network device, or may be performed by a chip disposed in the network device.

Therefore, the terminal device reports the frequency domain parameter to the network device, and the network device may configure, for the terminal device based on the frequency domain parameter, a reporting bandwidth and a ratio R' of a granularity of a second frequency domain unit (which is referred to as a second granularity for short below) to a granularity of the first frequency domain unit (which is referred to as a first granularity for short below). Herein, the second frequency domain unit may be a frequency domain unit based on which the terminal device reports the precoding matrix indicator (precoding matrix indicator, PMI), and the first frequency domain unit may be a frequency domain unit based on which the terminal device reports a channel quality indicator (channel quality indicator, CQI).

Within a range allowed by a capability of the terminal device, the network device may configure a first frequency domain unit at a smaller granularity for the terminal device, so that the terminal device performs channel measurement and PMI reporting on the first frequency domain unit at a smaller granularity, to obtain a more accurate PMI. Beyond the range of the capability of the terminal device, the network device may select a first frequency domain unit at a larger granularity, so that the terminal device performs channel measurement and PMI estimation on the first frequency domain unit at a larger granularity, to ensure that a parameter configured by the network device falls within the range of the capability of the terminal device, and avoid a failure to obtain feedback of the terminal device due to incorrect parameter configuration. Therefore, the network device can precode, based on a channel state fed back by the terminal device, data by using a precoding matrix matching the channel state, and then transmit the data, thereby improving data transmission performance, and helping improve system performance.

With reference to the first aspect or the second aspect, in some possible implementations, that the first indication information is used to indicate one or more frequency domain parameters and one or more of the following capability parameters associated with each frequency domain parameter: a port quantity, a spatial domain parameter, a reference signal resource quantity, and a total port quantity includes: the first indication information is used to indicate one or more capability parameter groups, and each capability parameter group includes one frequency domain parameter and one spatial domain parameter and one port quantity that are associated with the frequency domain parameter.

In other words, the frequency domain parameter, the spatial domain parameter, and the port quantity in each capability parameter group are one combination of capability parameters of the terminal device. When the network device configures a CSI measurement configuration parameter based on a capability parameter group, a quantity of first frequency domain units, a quantity of spatial domain vectors, and a port quantity for one reference signal resource that are configured by the network device fall within value ranges of respective parameters in the capability parameter group.

With reference to the first aspect or the second aspect, in some possible implementations, that the first indication information is used to indicate one or more frequency domain parameters and one or more of the following capability parameters associated with each frequency domain parameter: a port quantity, a spatial domain parameter, a reference signal resource quantity, and a total port quantity includes: the first indication information is used to indicate one or more capability parameter groups, each capability parameter group includes one frequency domain parameter and one spatial domain parameter associated with the frequency domain parameter, and the frequency domain parameter and the spatial domain parameter are associated with one port quantity.

In other words, the frequency domain parameter and the spatial domain parameter in each capability parameter group and the corresponding port quantity are one combination of capability parameters of the terminal device. In other words, the frequency domain parameter and the spatial domain parameter that are included in each capability parameter group are associated with the port quantity corresponding to the capability parameter group. It may be understood that, a same port quantity may correspond to one or more capability parameter groups including a frequency domain parameter and a spatial domain parameter, to form a plurality of combinations of port quantities, frequency domain parameters, and spatial domain parameters.

When the network device configures a CSI measurement configuration parameter based on a parameter in a combination, a quantity of first frequency domain units, a quantity of spatial domain vectors, and a port quantity for one reference signal resource that are configured by the network device fall within value ranges of respective parameters in the capability parameter group.

With reference to the first aspect or the second aspect, in some possible implementations, that the first indication information is used to indicate one or more frequency domain parameters and one or more of the following capability parameters associated with each frequency domain parameter: a port quantity, a spatial domain parameter, a reference signal resource quantity, and a total port quantity includes: the first indication information is used to indicate one or more first capability parameter groups and one or more second capability parameter groups; each first capability parameter group includes one frequency domain parameter and one spatial domain parameter associated with the frequency domain parameter; each second capability parameter group includes one port quantity, one reference signal resource quantity, and one total port quantity; each first capability parameter group is associated with at least one second capability parameter group; and a plurality of capability parameters in a same first capability parameter group are associated, and a plurality of capability parameters in a same second capability parameter group are associated.

In other words, the first indication information may indicate the frequency domain parameter, the spatial domain parameter, the port quantity, the reference signal resource quantity, and the total port quantity that are associated. In this embodiment, two different combinations of capability parameters are used to indicate the frequency domain parameter, the spatial domain parameter, the port quantity, the reference signal resource quantity, and the total port quantity that are associated. However, this shall not constitute any limitation on this application. A specific form in which the terminal device indicates the frequency domain parameter, the spatial domain parameter, the port quantity, the reference signal resource quantity, and the total port quantity that are associated is not limited in this application. For example, the first indication information may alternatively be used to indicate one or more capability parameter groups, and each capability parameter group includes one frequency domain parameter, one spatial domain parameter, one port quantity, one reference signal resource quantity, and one total port quantity.

Optionally, two associated second capability parameter groups may be associated by using a port quantity.

With reference to the first aspect or the second aspect, in some possible implementations, the indication of the frequency domain parameter by the first indication information includes the maximum quantity N of first frequency domain units that is supported by the terminal device, and N is a positive integer.

The network device may configure a reporting bandwidth for the terminal device based on the maximum quantity of first frequency domain units that is supported by the terminal device. The second frequency domain unit and the first frequency domain unit may be calculated by using a ratio R of the second granularity to the first granularity. Therefore, the network device may determine a maximum quantity of second frequency domain units in the reporting bandwidth based on the maximum quantity that can be supported by the terminal device.

With reference to the first aspect or the second aspect, in some possible implementations, the indication of the frequency domain parameter by the first indication information includes a maximum value of a granularity ratio R supported by the terminal device, the granularity ratio R indicates a preconfigured ratio of a granularity of a second frequency domain unit to a granularity of the first frequency domain unit, and R is a positive number.

The network device may determine, based on the ratio R of the second granularity to the first granularity that is supported by the terminal device and a default maximum quantity of second frequency domain units in a current protocol, a maximum quantity of first frequency domain units that can be supported by the terminal device.

With reference to the first aspect or the second aspect, in some possible implementations, the indication of the frequency domain parameter by the first indication information includes an indication indicating whether the terminal device supports a granularity ratio R being 2, and the granularity ratio R indicates a preconfigured ratio of a granularity of a second frequency domain unit to a granularity of the first frequency domain unit.

In a current protocol, a value of the ratio R of the second granularity to the first granularity is defined as 1 or 2. Therefore, when the first indication information indicates whether the terminal device supports R being 2, it indirectly indicates whether the value of R is 1 or 2. Therefore, a maximum quantity of first frequency domain units that can be supported by the terminal device may be determined.

With reference to the first aspect or the second aspect, in some possible implementations, the indication of the frequency domain parameter by the first indication information further includes a maximum quantity of second frequency domain units that is supported by the terminal device.

The terminal device may further indicate, by using the first indication information, the maximum quantity of second frequency domain units that is supported by the terminal device. Therefore, the network device may further determine, with reference to the value of R supported by the terminal device, the maximum quantity of first frequency domain units that can be supported by the terminal device.

With reference to the first aspect or the second aspect, in some possible implementations, the indication of the frequency domain parameter by the first indication information includes whether the maximum quantity N of first frequency domain units that is supported by the terminal device satisfies that $N \le N_0$; $N_0$ is a preset threshold; and optional values that are of the maximum quantity of first frequency domain units and that are supported by the terminal device when $N \le N_0$ and $N > N_0$ are predefined.

The optional values that are of the maximum quantity of first frequency domain units and that are supported by the terminal device when $N \le N_0$ and $N > N_0$ may be predefined in a protocol. Therefore, the terminal device may directly notify the network device whether the maximum quantity N that can be supported by the terminal device satisfies that $N \le N_0$. The network device may determine, based on the predefined optional values and a value relationship between N and $N_0$, a value of N that can be supported by the terminal device.

With reference to the first aspect or the second aspect, in some possible implementations, the first indication information is further used to indicate that when a transport layer quantity C is greater than 2, the spatial domain vector used for codebook generation supports independence between transport layers, independence between transport layer groups, or sharing by a plurality of transport layers; when the transport layer quantity C is greater than 2, the C transport layers belong to at least one transport layer group; each transport layer group includes one or more of the C transport layers; and C is a positive integer.

For a higher order codebook, because there may be several different implementations in which the spatial domain vector is independent between transport layers, independent between transport layer groups, and shared between transport layers, the terminal device may indicate an implementation supported by the terminal device, so that the network device configures, for the terminal device based on the implementation supported by the terminal device, a quantity of spatial domain vectors that needs to be reported.

With reference to the first aspect or the second aspect, in some possible implementations, when the first indication information indicates that when the transport layer quantity C is greater than 2, the spatial domain vector used for codebook generation satisfies independence between transport layers, the spatial domain parameter includes a spatial domain parameter in a one-to-one correspondence with each of the plurality of transport layers; and a spatial domain parameter corresponding to a first transport layer in the plurality of transport layers indicates a maximum quantity of spatial domain vectors that can be supported when the PMI is generated for the first transport layer.

To be specific, when the spatial domain vector is independent between transport layers, the terminal device may report, based on each transport layer, one maximum quantity of spatial domain vectors that can be supported, and the network device may configure, based on each transport layer, one quantity of spatial domain vectors that needs to be reported.

With reference to the first aspect or the second aspect, in some possible implementations, when the first indication information indicates that when the transport layer quantity C is greater than 2, the spatial domain vector used for codebook generation satisfies independence between transport layer groups, the spatial domain parameter includes a spatial domain parameter in a one-to-one correspondence with each of the at least one transport layer group; and a spatial domain parameter corresponding to a first transport layer group in the plurality of transport layer groups indicates a maximum quantity of spatial domain vectors that can be supported when the PMI is generated for each transport layer in the first transport layer group.

To be specific, when the spatial domain vector is independent between transport layer groups, the terminal device may report, based on each transport layer group, one maximum quantity of spatial domain vectors that can be supported, and the network device may configure, based on each transport layer group, one quantity of spatial domain vectors that needs to be reported.

According to a third aspect, a CSI reporting method is provided. Specifically, the method includes: A terminal device receives downlink control information, where the downlink control information is used to trigger CSI reporting. The terminal device determines that the CSI reporting triggered by the downlink control information satisfies a preset condition. The terminal device sends a CSI report when a first time interval is greater than or equal to a preconfigured first delay coefficient and a second time interval is greater than or equal to a preconfigured second delay coefficient. The first time interval is a time interval from an end position of the last symbol of a physical downlink resource of the downlink control information to a start position of the first symbol of a physical uplink resource used to transmit the CSI report, and the second time interval is a time interval from an end position of the last symbol of a reference signal resource used to determine the CSI to the start position of the first symbol of the physical uplink resource used to transmit the CSI report.

It should be understood that, the method provided in the third aspect may be performed by the terminal device, or may be performed by a chip disposed in the terminal device.

According to a fourth aspect, a CSI reporting method is provided. Specifically, the method includes: A network device determines that CSI reporting triggered by downlink control information satisfies a preset condition. The network device receives a CSI report when a first time interval is greater than or equal to a preconfigured first delay coefficient and a second time interval is greater than or equal to a preconfigured second delay coefficient, where the first time interval is a time interval from an end position of the last symbol of a physical downlink resource of the downlink control information to a start position of the first symbol of a physical uplink resource used to transmit the CSI report, and the second time interval is a time interval from an end position of the last symbol of a reference signal resource used to determine the CSI to the start position of the first symbol of the physical uplink resource used to transmit the CSI report.

It should be understood that, the method provided in the fourth aspect may be performed by the network device, or may be performed by a chip disposed in the network device.

Therefore, through extension of the delay coefficients $Z_2$ and $Z_2'$, in the case of different configuration parameters of the network device, the terminal device may determine, based on different delay coefficients, a manner of processing the CSI reporting triggered by the downlink control information. This may fit better with a type II codebook. When performing PMI measurement and reporting based on the type II codebook, the terminal device may have a longer processing time, thereby helping obtain more accurate PMI feedback, and helping improve data transmission performance.

With reference to the third aspect or the fourth aspect, in some possible implementations, the first delay coefficient is $Z_2$ symbols, the second delay coefficient is $Z_2'$ symbols, and values of $Z_2$ and $Z_2'$ are as follows:

| $\mu$ | $Z_2$ | $Z'_2$ |
|---|---|---|
| 0 | $\lceil 40\alpha_0 \rceil$ | $\lceil 37\beta_0 \rceil$ |
| 1 | $\lceil 72\alpha_1 \rceil$ | $\lceil 69\beta_1 \rceil$ |
| 2 | $\lceil 141\alpha_2 \rceil$ | $\lceil 140\beta_2 \rceil$ |
| 3 | $\lceil 152\alpha_3 \rceil$ | $\lceil 140\beta_3 \rceil$ |

$\mu$ is an index, each index is used to indicate one parameter set, the parameter set includes a subcarrier spacing and a cyclic prefix type, and in the case of different values, $\mu$ satisfies that $\alpha_\mu \geq 1$ and $\beta_\mu \geq 1$.

It can be learned that the delay coefficients $Z_2$ and $Z_2'$ may be further increased, by using different coefficients, based on different values of a granularity ratio R' configured by the network device, to match different calculation amounts of the terminal device in the case of different configured values. Therefore, it is more flexible and appropriate.

With reference to the third aspect or the fourth aspect, in some possible implementations, the preset condition includes:

- the CSI reporting is subband CSI reporting;
- a codebook used for the PMI reporting is a type II codebook;
- a plurality of reference signal resources are configured for the CSI reporting; or
- a port quantity configured for a reference signal resource used for the CSI reporting is greater than or equal to 4.

In other words, the method provided in the third aspect is not limited to being used when PMI reporting is performed based on the type II codebook. When the CSI reporting triggered by the downlink control information satisfies any one of the preset conditions listed above, the delay coefficients $Z_2$ and $Z_2'$ may be determined based on the foregoing table.

With reference to the third aspect, in some possible implementations of the third aspect, the method further includes: When the first time interval is less than the first delay coefficient, the terminal device determines that an uplink transmission resource for the CSI reporting triggered by the downlink control information is not used to transmit hybrid automatic repeat request (hybrid automatic repeat request, HARQ) information or a transport block; and the terminal device cancels sending of the CSI report. Correspondingly, in some possible implementations of the fourth aspect, the method further includes: When the first time interval is less than the first delay coefficient, the network device determines that an uplink transmission resource for the CSI reporting triggered by the downlink control information is not used to transmit hybrid automatic repeat request (hybrid automatic repeat request, HARQ) information or a transport block; and the network device cancels receiving of the CSI report.

In other words, if the first time interval is less than the first delay coefficient, and the physical uplink resource, for example, a physical uplink shared channel (physical uplink shared channel, PUSCH), used for the CSI reporting is not used to transmit the HARQ information or uplink data, the terminal device may ignore triggering of the CSI reporting by the downlink control information, and skip sending the CSI report. The network device does not receive CSI on the physical uplink resource.

The terminal device cancels sending of the CSI, so that power can be saved. In addition, because there is no uplink data or HARQ information that needs to be sent, cancelation of sending of the CSI report by the terminal device does not involve additional rate matching.

With reference to the third aspect, in some possible implementations of the third aspect, the method further includes: When the second time interval is less than the second delay coefficient, the terminal device determines that the downlink control information triggers one CSI report, and an uplink transmission resource for the CSI report triggered by the downlink control information is not used to transmit HARQ information or a transport block; and the terminal device cancels sending of the CSI report.

Correspondingly, in some possible implementations of the fourth aspect, the method further includes: When the second time interval is less than the second delay coefficient, the network device determines that the downlink control information triggers one CSI report, and an uplink transmission resource for the CSI report triggered by the downlink control information is not used to transmit HARQ information or a transport block; and the network device cancels receiving of the CSI report.

In other words, if the second time interval is less than the second delay coefficient, the downlink control information triggers only one CSI report, and a physical uplink resource, for example, a PUSCH, used for the CSI report is not used to transmit the HARQ information or uplink data, the terminal device may ignore triggering of the CSI report by the downlink control information, and skip sending the CSI report. The network device does not receive CSI on the physical uplink resource.

The terminal device cancels sending of the CSI, so that power can be saved. In addition, because there is no uplink data or HARQ information that needs to be sent, cancelation of sending of the CSI report by the terminal device does not involve additional rate matching.

With reference to the third aspect, in some possible implementations of the third aspect, the method further includes: When the first time interval is less than the first delay coefficient, the terminal device determines that an uplink transmission resource for the CSI reporting triggered by the downlink control information is used to transmit HARQ information or a transport block; or when the second time interval is less than the second delay coefficient, the terminal device determines that the downlink control information triggers a plurality of CSI reports, or an uplink transmission resource for the CSI reporting triggered by the downlink control information is used to transmit HARQ information or a transport block; and the terminal device sends a CSI report that is not updated.

Correspondingly, in some possible implementations of the fourth aspect, the method further includes: When the first time interval is less than the first delay coefficient, the network device determines that an uplink transmission resource for the CSI reporting triggered by the downlink control information is used to transmit HARQ information or a transport block; or when the second time interval is less than the second delay coefficient, the network device determines that the downlink control information triggers a plurality of CSI reports, or an uplink transmission resource for the CSI reporting triggered by the downlink control information is used to transmit HARQ information or a transport block; and the network device receives a CSI report that is not updated.

In other words, if the first time interval is less than the first delay coefficient, and the downlink control information triggers one or more CSI reports, the terminal device may send the CSI report that is not updated.

Alternatively, if the second time interval is less than the second delay coefficient, and the downlink control information triggers the plurality of CSI reports, the terminal device may send the CSI report that is not updated.

Alternatively, if the second time interval is less than the second delay coefficient, and the uplink transmission resource for the CSI reporting is used to transmit the HARQ information or uplink data, the terminal device may send the CSI report that is not updated.

The network device may also determine, based on a relationship between the first time interval and the first delay coefficient and a relationship between the second time interval and the second delay coefficient, whether the CSI report reported by the terminal device is an updated CSI report.

Optionally, the CSI report carries a predefined value, and the predefined value is used to indicate that the CSI report is a CSI report that is not updated.

The network device may directly determine, based on the predefined value carried in the CSI report, whether the CSI report is a CSI report that is not updated. This is more convenient.

According to a fifth aspect, a method for reporting a terminal device capability is provided. Specifically, the method includes: A terminal device sends second indication information, where the second indication information is used to indicate whether the terminal device supports a ratio R of a second granularity to a first granularity being 2. The terminal device receives third indication information, where the third indication information is used to indicate a ratio R' of the second granularity to the first granularity that is configured for the terminal device. The terminal device determines, based on R' configured by the network device, a quantity of simultaneously occupied CSI processing units, where each CSI processing unit is configured to process channel measurement that is performed based on a reference signal received on one reference signal resource. The second granularity is a granularity preconfigured for channel quality indicator CQI reporting, the first granularity is a granularity determined for a precoding matrix indicator PMI, and $R' \leq R$.

It should be understood that, the method provided in the fifth aspect may be performed by the terminal device, or may be performed by a chip disposed in the terminal device.

According to a sixth aspect, a method for reporting a terminal device capability is provided. Specifically, the method includes: A network device receives second indication information, where the second indication information is used to indicate whether the terminal device supports a ratio R of a second granularity to a first granularity being 2. The network device determines, based on the second indication information, a ratio R' of the second granularity to the first granularity that is configured for the terminal device. The network device sends third indication information, where the third indication information is used to indicate the ratio R' of the second granularity to the first granularity that is configured for the terminal device. The second granularity is a granularity preconfigured for channel quality indicator CQI reporting, the first granularity is a granularity determined for a precoding matrix indicator PMI, and $R' \leq R$.

It should be understood that, the method provided in the sixth aspect may be performed by the network device, or may be performed by a chip disposed in the network device.

Therefore, capability information indicating whether the terminal device supports R being 2 is reported to the network device, so that the network device may configure a plurality of possible values of R' for the terminal device. The terminal device may determine a corresponding quantity of CSI processing units based on different values of R' that are configured by the network device, to perform PMI measurement and reporting. Therefore, the value of R' that is configured by the network device can fall within a range of a capability of the terminal device. When the value of R' that is configured by the network device is 2, the terminal device may configure more computing resources for PMI measurement and reporting, thereby helping accurately and rapidly obtain the PMI for reporting. Therefore, it helps improve data transmission performance.

With reference to the fifth aspect or the sixth aspect, in some possible implementations, the quantity of simultaneously occupied CSI processing units in the terminal device is determined by the ratio R' of the second granularity to the first granularity that is configured by the network device.

The quantity of simultaneously occupied CSI processing units in the terminal device may be determined by a product of the ratio R' of the second granularity to the first granularity that is configured by the network device and a reference signal resource quantity that is configured in CSI reporting.

According to a seventh aspect, a communications apparatus is provided. The communications apparatus includes modules or units configured to perform the method according to any one of the first aspect, the third aspect, or the fifth aspect and the possible implementations of the first aspect, the third aspect, or the fifth aspect.

According to an eighth aspect, a communications apparatus is provided. The communications apparatus includes a processor. The processor is coupled to a memory, and may be configured to execute instructions in the memory, to implement the method according to any one of the first aspect, the third aspect, or the fifth aspect and the possible implementations of the first aspect, the third aspect, or the fifth aspect. Optionally, the communications apparatus further includes the memory. Optionally, the communications apparatus further includes a communications interface. The processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a ninth aspect, a communications apparatus is provided. The communications apparatus includes modules or units configured to perform the method according to any one of the second aspect, the fourth aspect, the sixth aspect and the possible implementations of the second aspect, the fourth aspect, or the sixth aspect.

According to a tenth aspect, a communications apparatus is provided. The communications apparatus includes a processor. The processor is coupled to a memory, and may be configured to execute instructions in the memory, to implement the method according to any one of the second aspect, the fourth aspect, the sixth aspect and the possible implementations of the second aspect, the fourth aspect, or the sixth aspect. Optionally, the communications apparatus further includes the memory. Optionally, the communications apparatus further includes a communications interface. The processor is coupled to the communications interface.

In an implementation, the communications apparatus is a network device. When the communications apparatus is the network device, the communications interface may be a transceiver or an input/output interface.

In another implementation, the communications apparatus is a chip disposed in the network device. When the communications apparatus is the chip disposed in the network device, the communications interface may be an input/output interface.

Optionally, the transceiver may be a transceiver circuit. Optionally, the input/output interface may be an input/output circuit.

According to an eleventh aspect, a processor is provided. The processor includes an input circuit, an output circuit, and a processing circuit. The processing circuit is configured to receive a signal by using the input circuit, and transmit a signal by using the output circuit, to enable the processor to perform the method according to any one of the first aspect to the sixth aspect and the possible implementations of the first aspect to the sixth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a twelfth aspect, a processing apparatus is provided. The processing apparatus includes a processor and a memory. The processor is configured to read instructions stored in the memory, and may receive a signal by using a receiver, and transmit a signal by using a transmitter, to perform the method according to any one of the first aspect to the sixth aspect and the possible implementations of the first aspect to the sixth aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read only memory, ROM). The memory and the processor may be integrated into one chip, or may be disposed in different chips. A type of the memory and a manner in which the memory and the processor are disposed are not limited in this embodiment of this application.

It should be understood that a related data exchange process, for example, sending of indication information, may be a process of outputting the indication information from the processor, and receiving of capability information, may be a process of receiving the input capability information by the processor. Specifically, data output by the processor may be output to a transmitter, and input data received by the processor may be from a receiver. The transmitter and the receiver may be collectively referred to as a transceiver.

The processing apparatus according to the twelfth aspect may be one or more chips. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a thirteenth aspect, a computer program product is provided. The computer program product includes a computer program (which may also be referred to as code or an instruction), and when the computer program is run, a computer is enabled to perform the method according to any one of the first aspect to the sixth aspect and the possible implementations of the first aspect to the sixth aspect.

According to a fourteenth aspect, a computer-readable medium is provided. The computer-readable medium stores a computer program (which may also be referred to as code or an instruction), and when the computer program is run on a computer, the computer is enabled to perform the method according to any one of the first aspect to the sixth aspect and the possible implementations of the first aspect to the sixth aspect.

According to a fifteenth aspect, a communications system is provided. The communications system includes the foregoing network device and the foregoing terminal device.

DETAILED DESCRIPTION OF EMBODIMENTS

The following describes the technical solutions in this application with reference to the accompanying drawings.

The technical solutions in embodiments of this application may be applied to various communications systems such as a global system for mobile communications (Global System for Mobile communications, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, a 5th generation (5th Generation, 5G) communications system, or a new radio access technology (new radio Access Technology, NR).

Figure 1:
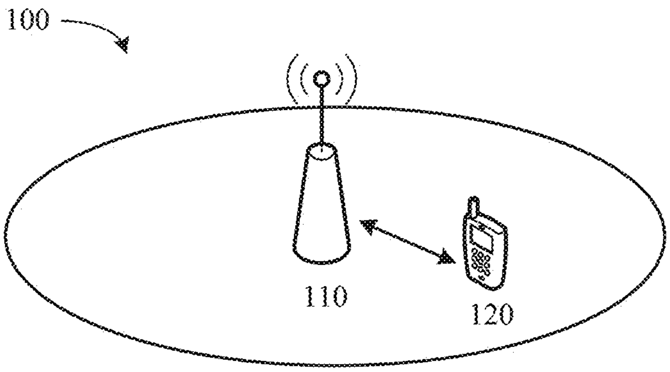
FIG. 1 is a schematic diagram of a communications system to which embodiments of this application are applicable.

For ease of understanding the embodiments of this application, a communications system to which the embodiments of this application are applicable is first described in detail with reference to FIG. 1. FIG. 1 is a schematic diagram of a communications system to which a sending and receiving method and apparatus are applicable according to embodiments of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate with each other through a radio link. A plurality of antennas may be configured for each communications device such as the network device 110 or the terminal device 120. The plurality of antennas may include at least one transmit antenna configured to send a signal and at least one receive antenna configured to receive a signal. In addition, each communications device additionally includes a transmitter chain and a receiver chain. A person of ordinary skill in the art may understand that the transmitter chain and the receiver chain each may include a plurality of components related to signal sending and receiving (for example, a processor, a modulator, a multiplexer, a demodulator, a demultiplexer, or an antenna). Therefore, the network device 110 and the terminal device 120 may communicate with each other by using a multiple-antenna technology.

It should be understood that the network device in the wireless communications system may be any device that has a wireless transceiver function. The device includes but is not limited to an evolved NodeB (evolved Node B, eNB), a radio network controller (Radio Network Controller, RNC), a NodeB (Node B, NB), a base station controller (Base Station Controller, BSC), a base transceiver station (Base Transceiver Station, BTS), a home base station (for example, a home evolved NodeB, or a home Node B, HNB), a baseband unit (BaseBand Unit, BBU), an access point (Access Point, AP) in a wireless fidelity (Wireless Fidelity, Wi-Fi) system, a wireless relay node, a wireless backhaul node, a transmission point (transmission point, TP), a transmission reception point (transmission and reception point, TRP), or the like. Alternatively, the device may be a gNB or a transmission point (TRP or TP) in a 5G system such as an NR system, one antenna panel or a group of antenna panels (including a plurality of antenna panels) of a base station in a 5G system, or a network node, such as a baseband unit (BBU) or a distributed unit (distributed unit, DU), that constitutes a gNB or a transmission point.

In some deployments, the gNB may include a centralized unit (centralized unit, CU) and a DU. The gNB may further include an active antenna unit (active antenna unit, AAU for short). The CU implements some functions of the gNB, and the DU implements some functions of the gNB. For example, the CU is responsible for processing a non-real-time protocol and a non-real-time service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that a network device may be a device including one or more of a CU node, a DU node, and an AAU node. In addition, the CU may be a network device in an access network (radio access network, RAN), or may be a network device in a core network (core network, CN). This is not limited in this application.

It should be further understood that the terminal device in the wireless communications system may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application.

To facilitate understanding of the embodiments of this application, the following first briefly describes terms used in this application.

1. Reporting bandwidth (reporting band): In NR, a bandwidth part (bandwidth part, BWP) may be divided into several subbands (subband) (that is, CQI subbands described below). The network device may indicate, by using signaling, for example, higher layer signaling, a quantity and positions of subbands for which CSI needs to be reported in the BWP. In the embodiments of this application, the reporting bandwidth may be a bandwidth configured by the network device in higher layer signaling (for example, a radio resource control (radio resource control, RRC) message) by using a reporting bandwidth (csi-ReportingBand) field in a CSI reporting configuration (CSI-ReportConfig) information element (information element, IE). The csi-ReportingBand information element may be used to indicate one group of consecutive or nonconsecutive subbands for which CSI needs to be reported in the BWP. The csi-ReportingBand information element may be, for example, a bitmap. Each bit may correspond to one subband in the BWP. Each bit in the bitmap may be used to indicate whether CSI needs to be reported for a corresponding subband. For example, when an indicator bit is set to "1", CSI needs to be reported for a corresponding subband; or when an indicator bit is set to "0", CSI does not need to be reported for a corresponding subband.

Figure 2:
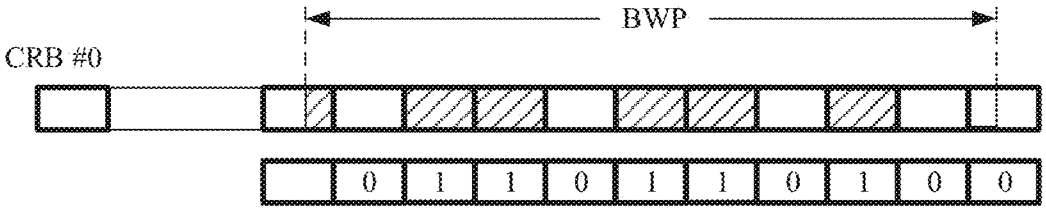
FIG. 2 is a schematic diagram of a bandwidth part (bandwidth part, BWP), a subband, and a reporting bandwidth.

FIG. 2 shows an example of a BWP, a subband, and a reporting bandwidth. As shown in FIG. 2, each black box in the figure is a subband, and a subband with a shade is a subband for which CSI needs to be reported. A plurality of subbands in the BWP correspond to a plurality of bits in a bitmap. A value of each bit indicates whether CSI needs to be reported for a corresponding subband. A plurality of subbands for which CSI needs to be reported in the BWP may be referred to as a reporting bandwidth.

It should be understood that a meaning expressed by a value of the indicator bit listed herein is merely an example, and shall not constitute any limitation on this application.

The subband may be a subband based on which a channel quality indicator (channel quality indicator, CQI) is reported, or a frequency domain unit based on which a CQI is reported. The terminal device may receive a reference signal on the reporting bandwidth, to perform channel measurement and CQI reporting.

It should be understood that, the signaling used to configure the reporting bandwidth and the signaling used to indicate the subband for which reporting is to be performed that are listed above are merely examples, and shall not constitute any limitation on this application. The signaling used to indicate the reporting bandwidth, the signaling used to indicate the subband for which reporting is to be performed, and a specific indication manner are not limited in this application.

In addition, the reporting bandwidth may be continuous, or may be discontinuous. This is not limited in this application.

2. Frequency domain unit: A frequency domain unit is a unit of a frequency domain resource, and may represent different frequency domain resource granularities. The frequency domain unit may include, for example, but not limited to, a subband, a resource block (resource block, RB), a resource block group (resource block group, RBG), and a precoding resource block group (precoding resource block group, PRG).

In the embodiments of this application, different types of frequency domain units may be defined based on different functions. Specifically, a subband based on which a PMI is reported or a subband corresponding to PMI reporting may be referred to as a first frequency domain unit. A subband based on which a CQI reported or a subband corresponding to CQI reporting may be referred to as a second frequency domain unit. In the embodiments of this application, the first frequency domain unit and a PMI subband are alternately used, and the second frequency domain unit and a CQI subband are alternately used. Meanings expressed by the terms are the same.

Herein, the frequency domain unit corresponding to the CQI reporting may specifically mean that a CQI is reported based on the frequency domain unit, and the network device may determine, based on CQIs reported based on a plurality of frequency domain units, a modulation and coding scheme (modulation and coding scheme, MCS) used for signal transmission.

The frequency domain unit corresponding to the PMI reporting may specifically mean that a PMI is reported based on the frequency domain unit, and the network device may determine, based on the PMI, a precoding matrix used for data transmission on the frequency domain unit.

The first frequency domain unit and the second frequency domain unit may have a same granularity, or may have different granularities. This is not limited in this application.

The granularity of the second frequency domain unit based on which a CQI is reported may be preconfigured. The granularity of the first frequency domain unit based on which a PMI is reported may also be predetermined. For ease of differentiation and description, the frequency domain unit granularity preconfigured for the CQI reporting is denoted as a second granularity, and the frequency domain unit granularity predetermined for the PMI reporting is denoted as a first granularity.

Optionally, the first granularity is less than the second granularity. In the embodiments of this application, different granularities may be distinguished by a quantity of included RBs. For example, that the first granularity is less than the second granularity may specifically mean that a quantity of RBs included in the first granularity is less than a quantity of RBs included in the second granularity.

The network device may indicate the second granularity to the terminal device by using signaling, or configure the second granularity by using signaling. The second granularity may be configured, for example, by using higher layer signaling CSI reporting configuration (CSI-ReportConfig). The second granularity may be specifically indicated by a subband granularity (subband size) field in the CSI reporting configuration. In other words, the second granularity may be a preconfigured CQI subband granularity.

The network device may further configure a ratio of the second granularity to the first granularity for the terminal device by using higher layer signaling. For ease of description below, the ratio of the second granularity to the first granularity is denoted as a granularity ratio. In addition, for ease of differentiation, in the embodiments of this application, a granularity ratio configured by the network device for the terminal device is denoted as R'. A granularity ratio that can be supported by the terminal device and that is reported by the terminal device in the following descriptions is denoted as R.

The first granularity may be determined based on the preconfigured second granularity and the preconfigured granularity ratio R'. For example, the quantity of RBs included in the first granularity is denoted as $N_1$, and the quantity of RBs included in the second granularity is denoted as $N_2$. In this case, $N_1=N_2/R'$. When R' is 1, the first granularity and the second granularity are a same granularity. When R is greater than 1, the first granularity is less than the second granularity.

In a possible design, R'=2. That is, the ratio of the second granularity to the first granularity is 2. In other words, the quantity of RBs included in the second granularity is twice the quantity of RBs included in the first granularity.

It should be noted that although the granularity (that is, the second granularity) of the second frequency domain unit is preconfigured, it cannot be ensured that granularities of all second frequency domain units are equal to the preconfigured second granularity in a reporting bandwidth actually configured for the terminal device. This is mainly because a start position of a BWP is different from a reference point for subband division. Specifically, in NR, each carrier is divided into RBs in a unit of 12 consecutive subcarriers in frequency domain, and RBs are divided by a “point A (point A)” as a common reference point. Specifically, a number of a common resource block (common resource block, CRB) may start from 0, for example, denoted as a CRB #0. A midpoint of a subcarrier 0 in the CRB #0 in frequency domain may correspond to the point A, and the point A may be configured by the network device for the terminal device. The CRB #0 may be used as a reference point for CQI subband division.

On the other hand, a maximum of four BWPs may be configured on a same carrier. Each BWP may include a plurality of consecutive physical resource blocks (physical resource block, PRB), and the PRBs in each BWP may be numbered from 0. The BWP is divided into several CQI subbands (that is, the second frequency domain unit), each CQI subband includes a group of consecutive PRBs, and the CQI subbands are divided by using the CRB #0 as a reference point. Therefore, sizes of the first CQI subband and the last CQI subband in the BWP are not necessarily equal to a preconfigured CQI subband granularity, that is, the second granularity described above.

It should be understood that, the PRB and the RB may represent a same meaning when being used to represent a physical resource.

Referring to FIG. 2, a reference point for CQI subband division is the CRB #0 in the figure. The start position of the BWP is determined based on signaling configured by the network device for the terminal device. The start position of the BWP may be aligned with a start point of an RB, or may not be aligned with a start point of any RB. An end position of the BWP may be aligned with an end point of an RB, or may not be aligned with a start point of any RB. The figure shows an example in which the start position of the BWP is not aligned with the start point of the RB, and the end position of the BWP is not aligned with the end point of the RB.

Specifically, the first CQI subband in the BWP includes $$N_{PRB}^{SB}-\left(N_{BWP}^{start} \bmod N_{PRB}^{SB}\right)$$

RBs, and the last CQI subband in the BWP includes $$\left(N_{BWP}^{start}+N_{BWP}^{size}\right) \bmod N_{PRB}^{SB}\ RBs \cdot N_{PRB}^{SB}$$

indicates a quantity of PRBs included in each CQI subband, $$N_{BWP}^{start}$$

indicates a start PRB of the first CQI subband in the BWP, and $$N_{BWP}^{size}$$

indicates a quantity of RBs included in the BWP. A size of a CQI subband at the edge of the BWP is not necessarily the preconfigured CQI subband granularity. mod indicates a modulo operation, for example, (A mod B) indicates a remainder obtained by dividing A by B.

If the CQI subband at the edge of the reporting bandwidth is exactly the first subband or the last subband in the BWP, the subband for which a CQI is to be reported may be an incomplete CQI subband. A granularity of the CQI subband may be less than the preconfigured CQI subband granularity. As shown in the figure, the first CQI subband in the reporting bandwidth occupies only some RBs of a normal CQI subband, and the last CQI subband also occupies only some RBs of the normal CQI subband. It should be understood that, the foregoing preconfigured CQI subband granularity may be a CQI subband granularity configured for CQI reporting, that is, may be an example of the preconfigured second granularity in the embodiments of this application. The CQI subband described above may be a CQI subband configured for CQI reporting, that is, may be an example of the second frequency domain unit in the embodiments of this application. It can be learned from the foregoing descriptions that the granularity of the second frequency domain unit is not necessarily the preconfigured second granularity.

As described above, the first granularity may be determined based on the preconfigured second granularity and the preconfigured granularity ratio R'. To obtain more accurate PMI feedback of the terminal device, R' may be designed to be a value greater than 1, for example, R' is 2.

However, because the granularity of the CQI subband at the edge of the reporting bandwidth is not necessarily the preconfigured second granularity, the CQI subband at the edge of the reporting bandwidth (which is referred to as an edge CQI subband for short below) may include an odd number of PRBs, for example, three or five PRBs, or even one PRB. If the edge CQI subband is divided based on the preconfigured granularity ratio R' being 2, a pilot density may become smaller or even zero.

For example, a preconfigured pilot density is 1, that is, only one RE in each PRB carries a reference signal. When the edge CQI subband includes only one PRB, if the edge CQI subband is divided into two parts based on a quantity of subcarriers in the PRB, that is, the first six subcarriers form one PMI subband, and the last six subcarriers form one PMI subband, no reference signal is transmitted on one of the two PMI subbands, and the terminal device cannot perform channel measurement based on the subband, to estimate a PMI.

Therefore, the edge CQI subband may be separately processed. There are a plurality of implementations of processing the edge CQI subband. It is assumed that a quantity of CQI subbands in the reporting bandwidth is $N_{SB}$, and a quantity of PMI subbands obtained by dividing the CQI subbands is N. N and $N_{SB}$ are both positive integers.

In an implementation, the edge CQI subband may be directly processed as a PMI subband, that is, the edge CQI subband is not divided. When R'=1, the quantity N of PMI subbands is equal to $N_{SB}\times R'$. When R'=2, the quantity N of PMI subbands is equal to $N_{SB}\times R'-a$, where a indicates a quantity of edge CQI subbands. For example, the quantity of edge CQI subbands shown in FIG. 2 is 2, that is, a=2.

In another implementation, the edge CQI subbands may be divided based on the granularity ratio, and the quantity N of PMI subbands is equal to $N_{SB}\times R'$.

Further, in a possible design of a type II (type II) codebook, when a product of the quantity $N_{SB}$ of CQI subbands and the granularity ratio R' is less than or equal to 13, that is, $N_{SB}\times R'\leq 13$, a quantity $N_3$ of actually configured PMI subbands is equal to $N_{SB}\times R'$; or when a product of the quantity $N_{SB}$ of CQI subbands and the granularity ratio R is greater than 13, that is, $N_{SB}\times R'>13$, a quantity N of actually configured PMI subbands is a product of powers of 2, 3, and 5. The terminal device may change, in a manner such as zero padding or cropping, a quantity of actually processed frequency domain dimensions to $2^{\alpha}3^{\beta}5^{\gamma}$. α, β, and γ are any integers greater than or equal to 0.

For example, if a quantity of "1s" in the bitmap used to indicate the reporting bandwidth is 14, and R'=2, the quantity of actually processed PMI subbands should be a value greater than 14×2=28. In addition, if the quantity of PMI subbands is an integer of $2^{\alpha}3^{\beta}5^{\gamma}$, the quantity of PMI subbands may be selected as 30.

Based on the foregoing processing manner of the edge CQI subband, if the edge CQI subband is not divided, a value range of N may be {1, 2, 3, 4, 5, 6, 7, 8, 9, 10, 11, 12, 13, 15, 16, 18, 20, 24, 25, 27, 30, 32, 36, 40}. If the edge CQI subband is divided, a value range of N may be {1, 2, 3, 4, 5, 6, 7, 8, 9, 10, 11, 12, 13, 15, 16, 18, 20, 24, 25, 27, 30, 32, 36}.

3. Precoding matrix indicator (PMI): A PMI may be used to indicate a precoding matrix. The precoding matrix may be, for example, a precoding matrix that is determined by the terminal device based on a channel matrix of each frequency domain unit (for example, a PMI subband) and that corresponds to each frequency domain unit.

The channel matrix may be determined by the terminal device through channel estimation or the like or based on channel reciprocity. However, it should be understood that a specific method for determining the channel matrix by the terminal device is not limited to the foregoing descriptions. For a specific implementation, refer to the conventional technology. For brevity, examples are not listed herein one by one.

The precoding matrix may be obtained by performing singular value decomposition (singular value decomposition, SVD) on a channel matrix or a covariance matrix of the channel matrix, or may be obtained by performing eigenvalue decomposition (eigenvalue decomposition, EVD) on the covariance matrix of the channel matrix. Specifically, a downlink channel may be decomposed into several mutually orthogonal sub-channels, and each sub-channel may be represented by one eigenvector. In addition, an optimal sub-channel may be selected from these sub-channels, and the optimal sub-channels may be fitted by using a plurality of mutually orthogonal spatial domain vectors (spatial domain vectors).

Therefore, a larger quantity of spatial domain vectors indicates a larger dimension of the SVD or the EVD, which increases calculation complexity of the terminal device.

The following describes the spatial domain vector in detail, and related descriptions of the spatial domain vector are omitted herein.

To obtain more accurate PMI feedback, a current protocol supports PMI feedback at a smaller granularity. That is, the first granularity described above may be less than or equal to the second granularity. For example, $N_1=N_2/R'$, and $R'\geq 1$.

An example in which R'=2 is used. In this case, a granularity of the PMI subband is a half of a granularity of the CQI subband. In other words, a quantity of SVD or EVD operations that need to be performed may be doubled.

If R'=1, the granularity of the PMI subband may be the same as the granularity of the CQI subband. For example, a quantity of PMI subbands is 16. It is assumed that a density of reference signals used for channel estimation is 1. That is, a reference signal of each port is carried by using one RE in one PRB. In this case, the terminal device may estimate a downlink channel matrix based on the reference signal received on the PRB. The terminal device usually first calculates 16 downlink channel matrices that are respectively obtained through estimation in 16 PRBs. The terminal device may perform SVD after averaging the 16 downlink channel matrices, or the terminal device may calculate a covariance matrix of the 16 downlink channel matrices, and perform EVD on the covariance matrix. It can be learned that the terminal device may determine a precoding matrix based on one time of SVD or EVD.

However, if R'=2, the granularity of the PMI subband is a half of the granularity of the CQI subband. The 16 PRBs of the reference signals used for channel estimation may be divided into two parts, and each part has eight PRBs. The terminal device may separately perform SVD or EVD after estimating the downlink channel matrix based on the reference signal received on the RB in each part. That is, when other configuration parameters remain unchanged, a calculation amount of SVD or EVD is approximately doubled.

It should be understood that the foregoing listed specific manner of determining the precoding matrix is merely an example, and shall not constitute any limitation on this application. For a specific manner of determining the precoding matrix, refer to the conventional technology. For brevity, details are not described herein.

4. Spatial domain vector (spatial domain vector), which may also be referred to as a spatial domain beam, a beam vector, or the like. Each element in a spatial domain vector may represent a weight of each antenna port. Based on the weight of each antenna port that is represented by each element in the spatial domain vector, signals of the antenna ports are linearly superimposed, to form an area with a relatively strong signal in a direction in space.

For example, the spatial domain vector may be selected from a spatial domain vector set. For example, the spatial domain vector set may include vectors in a discrete Fourier transform (Discrete Fourier Transform, DFT) matrix. Therefore, the spatial domain vector selected to fit the optimal sub-channel may be a DFT vector. For example, the spatial domain vector may be a DFT vector defined in a type II (type II) codebook in the NR protocol TS 38.214 Release 15 (release 15, R15).

5. Channel quality indicator (CQI), which may be used to indicate channel quality. A CQI may be represented by, for example, a signal-to-noise ratio (signal noise ratio, SNR) or a signal to interference plus noise ratio (signal to interference plus noise ratio, SINR). The CQI may be used to determine a modulation and coding scheme (MCS). In downlink transmission, the network device may determine, based on a CQI fed back by the terminal device, an MCS corresponding to channel quality, to perform coding and modulation processing on a to-be-sent signal. For example, the network device may determine, based on a predefined correspondence between a CQI and an MCS, an MCS corresponding to a CQI that is currently fed back.

It should be understood that, the foregoing listed SNR and SINR that are used to represent the CQI and the listed correspondence between a CQI and an MCS are merely examples, and shall not constitute any limitation on this application. Specific content and an indication manner of the CQI are not limited in this application. A relationship between a CQI and an MCS is not limited in this application either.

6. Reference signal and reference signal resource: A reference signal may be used for channel measurement, channel estimation, beam quality monitoring, or the like. A reference signal resource may be used to configure transmission attributes, for example, a time-frequency resource position, a port mapping relationship, a power factor, and a scrambling code, of a reference signal. For details, refer to the conventional technology. A transmit end device may send a reference signal based on a reference signal resource, and a receive end device may receive a reference signal based on a reference signal resource.

The reference signal in the embodiments of this application may include, for example, but not limited to, a channel state information reference signal (channel state information reference signal, CSI-RS) and a sounding reference signal (SRS). Correspondingly, the reference signal resource may include but is not limited to a CSI-RS resource (CSI-RS resource) and an SRS resource (SRS resource).

It should be understood that, the reference signal and the corresponding reference signal resource that are listed above are merely examples for description, and shall not constitute any limitation on this application. This application does not exclude a possibility of defining another reference signal in a future protocol to implement a same or similar function.

7. CSI reporting configuration (CSI ReportConfig), which may be used to configure a resource for channel measurement (resourceForChannelMeasurement). A CSI reporting configuration may be bound to one reference signal resource set, and the reference signal resource set may include one or more reference signal resources. For example, the reference signal resource set is a CSI-RS resource set (CSI-RS resource set), and the CSI-RS resource set may include one or more CSI-RS resources.

The terminal device may receive reference signals based on the plurality of reference signal resources, to perform channel measurement. The terminal device may report a group of measurement results in the CSI report. The group of measurement results may be obtained by performing channel measurement based on a reference signal received on one of the plurality of reference signal resources. In addition, a channel measurement result obtained by the terminal device based on the reference signal received on the reference signal resource is optimal.

Therefore, in a channel measurement process of the terminal device, a quantity of reference signal resources and a port quantity for each reference signal resource affect complexity of CSI estimation performed by the terminal device.

In addition, in configuration signaling of the reference signal resource, different time domain behaviors (time domain behavior) may be indicated by using different time domain behavior parameters. By way of example and not limitation, the time domain behaviors may include, for example, a periodic (periodic) behavior, a semi-persistent (semi-persistent, SP) behavior, and an aperiodic (aperiodic, AP) behavior.

8. Antenna port (antenna port), which is referred to as a port for short. The antenna port may be understood as a virtual antenna identified by a receive end, or a transmit antenna that is spatially distinguishable. One antenna port may be configured for each virtual antenna, each virtual antenna may be a weighted combination of a plurality of physical antennas, and each antenna port may correspond to one reference signal. Therefore, each antenna port (or a port for short) may be referred to as one reference signal port.

Figure 3:
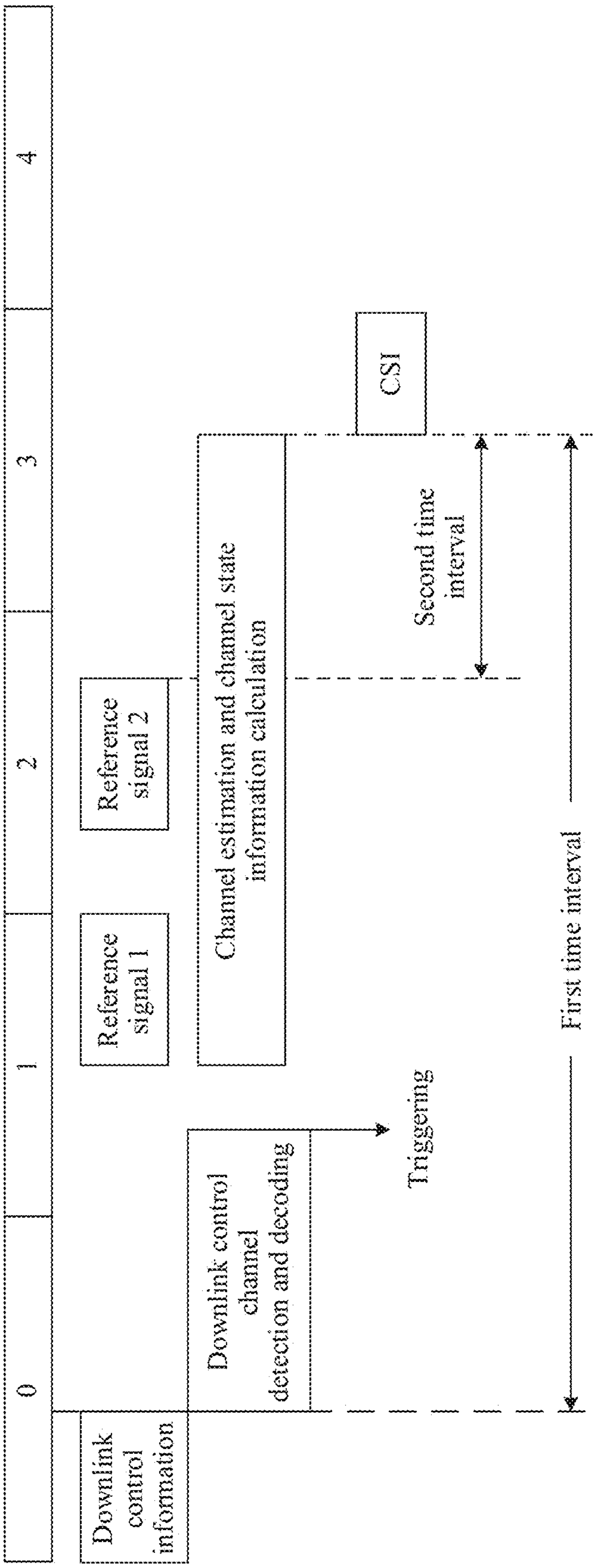
FIG. 3 is a schematic diagram of a first time interval and a second time interval.

9. Delay coefficient: To ensure that the terminal device has a sufficient time to estimate and calculate CSI, the following two parameters Z and Z' are defined in the NR protocol Release 15 (R 15). A value of Z is related to a CSI type and a subcarrier spacing, and the value of Z may be preset. Z may represent a minimum quantity of symbols from an end position of the last symbol of a PDCCH including downlink control information (for example, DCI) that triggers a CSI report to a start position of the first symbol of a physical uplink channel used to carry the CSI report. Z' may represent a minimum quantity of symbols from an end position of the last symbol of a measurement reference resource used for current CSI measurement to a start position of the first symbol of a physical uplink channel used to carry a CSI report. Correspondingly, a first time interval and a second time interval are defined in this application. The first time interval represents a quantity of symbols from an end position of the last symbol of a PDCCH including downlink control information (for example, DCI) that triggers a CSI report to a start position of the first symbol of a physical uplink channel used to carry the CSI report. The second time interval indicates a quantity of symbols from an end position of the last symbol of a measurement reference resource used for current CSI measurement to a start position of the first symbol of a physical uplink channel used to carry a CSI report. FIG. 3 is a schematic diagram of the first time interval and the second time interval.

It should be noted that the measurement resource described herein includes a non zero power CSI-RS resource (non zero power channel state information-reference signal resource, NZP CSI-RS resource) used for channel measurement, a CSI-interference measurement resource (channel state information-interference measurement resource, CSI-IM resource) used for interference measurement, and an NZP-CSI-RS resource used for interference measurement.

When the first time interval is greater than or equal to Z symbols and the second time interval is greater than or equal to Z' symbols, the terminal device may report estimated CSI to the network device by using a physical uplink resource.

When the first time interval is less than Z symbols or the second time interval is less than Z' symbols, downlink control information triggers only one CSI report, and a physical uplink resource for the CSI report triggered by the downlink control information is not used to transmit HARQ information or a transport block, the terminal device may ignore triggering by the downlink control information, and perform no processing. The terminal device cancels sending of the CSI, so that power can be saved. In addition, because there is no uplink data or HARQ information that needs to be sent, additional rate mating is not involved.

When second time interval is less than Z' symbols, and downlink control information triggers a plurality of CSI reports or a physical uplink resource for CSI reporting triggered by the downlink control information is used to transmit HARQ information or a transport block, the terminal device sends a CSI report that is not updated, or include a predefined value in a CSI report, to indicate that the terminal device does not report an updated CSI report.

The CSI report that is not updated and that is sent by the terminal device may be, for example, a previously reported CSI report stored in a report buffer. Alternatively, the terminal device may include a predefined value in a CSI report, for example, include a CSI result that is beyond a range. For example, if a value range of a PMI is 0 to 15, the terminal device may report 16. In this case, the network device may determine, based on the CSI result that is beyond the range, that the terminal device does not report an updated CSI report.

When CSI reporting and uplink data use a same physical uplink resource, for example, a physical uplink shared channel (physical uplink shared channel, PUSCH), if CSI reporting is directly discarded, additional complexity of the UE and the base station is caused. This is because allocation of the physical uplink resource is determined based on load when the terminal device has both CSI reporting and uplink data. If the terminal device discards the CSI reporting, the terminal device and the network device need to perform rate matching again.

For specific use of Z and Z', refer to the NR protocol. For brevity, details are not described herein.

Actually, a port quantity for a reference signal resource, a frequency domain granularity, a PMI codebook type, and reporting content all affect complexity of CSI estimation. In Rel-15, three different types of (Z, Z') are defined. As shown in the following Table 1, when ($Z_1$, $Z'_1$) is used for low-delay CSI measurement, the terminal device determines whether to respond to current CSI reporting triggering signaling. A specific condition is as follows: A reporting type is wideband CSI, a PMI is of a type I or there is no PMI reporting, current CSI reporting is bound only to one CSI-RS resource, and the CSI-RS resource used for channel measurement has a maximum of four ports. When ($Z_3$, $Z'_3$) is used for beam management and measurement, that is, reporting content is set to channel state information reference signal resource identifier (CSI-RS resource indicator, CRI)-received power (receiving power, RSRP) ('cri-RSRP') or synchronization signal block (synchronization signal block, SSB) index (index) reference signal received power ('ssb-Index-RSRP'), the terminal device determines whether to respond to current CSI reporting triggering signaling. In the table, $X_i$ represents a delay of beam reporting by the terminal device, and a specific value is determined based on a capability reported by the terminal device; and $KB_i$ represents a delay of beam switching by the terminal device, and similarly, a specific value is determined based on the capability reported by the terminal device. When ($Z_2$, $Z'_2$) is used for high-delay CSI calculation, that is, in a configuration condition other than beam management and measurement configuration and low-delay CSI configuration, the terminal device determines whether to respond to current CSI reporting triggering signaling.

TABLE 1

| | $Z_1$ (symbols) | | $Z_2$ (symbols) | | $Z_3$ (symbols) | |
|---|---|---|---|---|---|---|
| μ | $Z_1$ | $Z'_1$ | $Z_2$ | $Z'_2$ | $Z_1$ | $Z'_1$ |
| 0 | 22 | 16 | 40 | 37 | 22 | $X_1$ |
| 1 | 33 | 30 | 72 | 69 | 33 | $X_2$ |
| 2 | 44 | 47 | 141 | 140 | min(44, $X_3$ + $KB_1$) | $X_3$ |
| 3 | 97 | 85 | 152 | 140 | min(97, $X_4$ + $KB_2$) | $X_4$ |

μ is an index. Each index is used to indicate one parameter set, and the parameter set includes a subcarrier spacing and a cyclic prefix type It should be understood that, the values in Table 1 are merely examples, and shall not constitute a limitation on related values in this application.

As described above, to improve precision of PMI feedback, the granularity of the PMI subband may be reduced. Therefore, a calculation amount of PMI estimation performed by the terminal device may be approximately doubled. This is very challenging for the terminal device. If the capability of the terminal device is insufficient to support PMI estimation at a smaller granularity, the terminal device may not perform PMI reporting at all. Therefore, the network device cannot obtain a real-time channel state, and cannot determine, based on a latest channel state, a precoding matrix used for data transmission. Consequently, data transmission performance and system performance are affected.

In view of this, this application provides a method for reporting a terminal device capability, to configure a CSI measurement resource configuration parameter for a terminal device within a range of a capability of the terminal device to perform PMI estimation.

Before the method provided in the embodiments of this application is described, the following descriptions are first provided.

First, in the embodiments of this application, the "indication" may include a direct indication and an indirect indication, or may include an explicit indication and an implicit indication. Information indicated by a piece of information (configuration information described below) is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, specific information may also be indicated by using a pre-agreed (for example, stipulated in a protocol) arrangement sequence of various pieces of information, to reduce indication overheads to some extent.

Second, in the embodiments shown below, terms and English abbreviations, for example, downlink control information (DCI), a media access control control element (MAC-CE), radio resource control (RRC), a physical downlink control channel (physical downlink control channel, PDCCH), a physical downlink shared channel (physical downlink shared channel, PDSCH), a physical uplink control channel (physical uplink control channel, PUCCH), and a physical uplink shared channel (physical uplink shared channel, PUSCH), a control resource set (control resource set, CORESET), a channel state information reference signal (CSI-RS), a sounding reference signal (SRS), a synchronization signal/physical broadcast channel (SS/PBCH), a synchronization signal block (SSB), and a transmission configuration indicator (TCI), are all examples provided for ease of description, and shall not constitute any limitation on this application. This application does not exclude a possibility of defining another term that can implement a same or similar function in an existing or a future protocol.

Third, "first", "second", and various numbers in the embodiments shown below are merely used for differentiation for ease of description, and are not intended to limit the scope of the embodiments of this application. For example, frequency domain units of different indication information, different granularities, different types, or different functions are distinguished.

Fourth, in the embodiments shown below, "being pre-obtained" may include "being indicated by the network device by using signaling" or "being predefined", for example, "being defined in a protocol". The "predefinition" may be implemented in a manner in which corresponding code, a table, or other related indication information may be prestored in a device (for example, including a terminal device and a network device). A specific implementation of the "predefinition" is not limited in this application.

Fifth, "storage" in the embodiments of this application may be storage in one or more memories. The one or more memories may be separately disposed, or may be integrated into an encoder or a decoder, a processor, or a communications apparatus. Alternatively, some of the one or more memories may be separately disposed, and some of the one or more memories are integrated into a decoder, a processor, or a communications apparatus. The memory may be a storage medium in any form. This is not limited in this application.

Sixth, a "protocol" in the embodiments of this application may be a standard protocol in the communications field, for example, may include an LTE protocol, an NR protocol, and a related protocol applied to a future communications system. This is not limited in this application.

Seventh, "at least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one item (piece) of the following" or a similar expression thereof means any combination of these items, including a singular item (piece) or any combination of plural items (pieces). For example, at least one of a, b, and c may indicate a, b, c, a and b, a and c, b and c, or a, b, and c, where a, b, and c may be singular or plural.

Eighth, in the embodiments provided below, an example in which channel measurement and PMI feedback are performed based on the type II (type II) codebook is used to describe a specific process in which the terminal device reports a capability parameter and the network device configures a CSI measurement configuration parameter based on the capability parameter. However, this shall not constitute any limitation on this application. The method provided in this application is not limited to being used in a scenario in which channel measurement and PMI feedback are performed based on the type II codebook. The method provided in this application is further applicable to another possible scenario of channel measurement and PMI feedback.

Ninth, in the embodiments of this application, for ease of differentiation and understanding, the granularity ratio configured by the network device and the granularity ratio that can be supported and reported by the terminal device are distinguished by using R' and R; and the quantity of second frequency domain units that is configured by the network device and the maximum quantity of second frequency domain units that can be supported and that is reported by the terminal device are distinguished by using $N_{SB}$ and $N_{SB}'$. However, this distinction is made only for ease of understanding. In the NR protocol, a same letter R may be used to represent the granularity ratio configured by the network device and the granularity ratio supported by the capability reported by the terminal device, and a same letter $N_{SB}$ may also be used to represent the quantity of second frequency domain units that is configured by the network device and the maximum quantity of second frequency domain units that can be supported and that is reported by the terminal device. Certainly, other capability parameters may also be processed by using a similar method. Examples are not provided for description herein one by one.

The method for reporting a terminal device capability and the communications apparatus provided in this application are described in detail below with reference to the accompanying drawings.

It should be understood that the technical solutions in this application may be applied to a wireless communications system, for example, the communications system 100 shown in FIG. 1. There is a wireless communication connection between two communications apparatuses in the wireless communications system. One of the two communications apparatuses may correspond to the terminal device 120 shown in FIG. 1, for example, may be the terminal device in FIG. 1, or may be a chip disposed in the terminal device. The other one of the two communications apparatuses may correspond to the network device 110 shown in FIG. 1, for example, may be the network device in FIG. 1, or may be a chip disposed in the network device.

Without loss of generality, the following describes the method provided in the embodiments of this application in detail by using an interaction process between the terminal device and the network device as an example.

Figure 4:
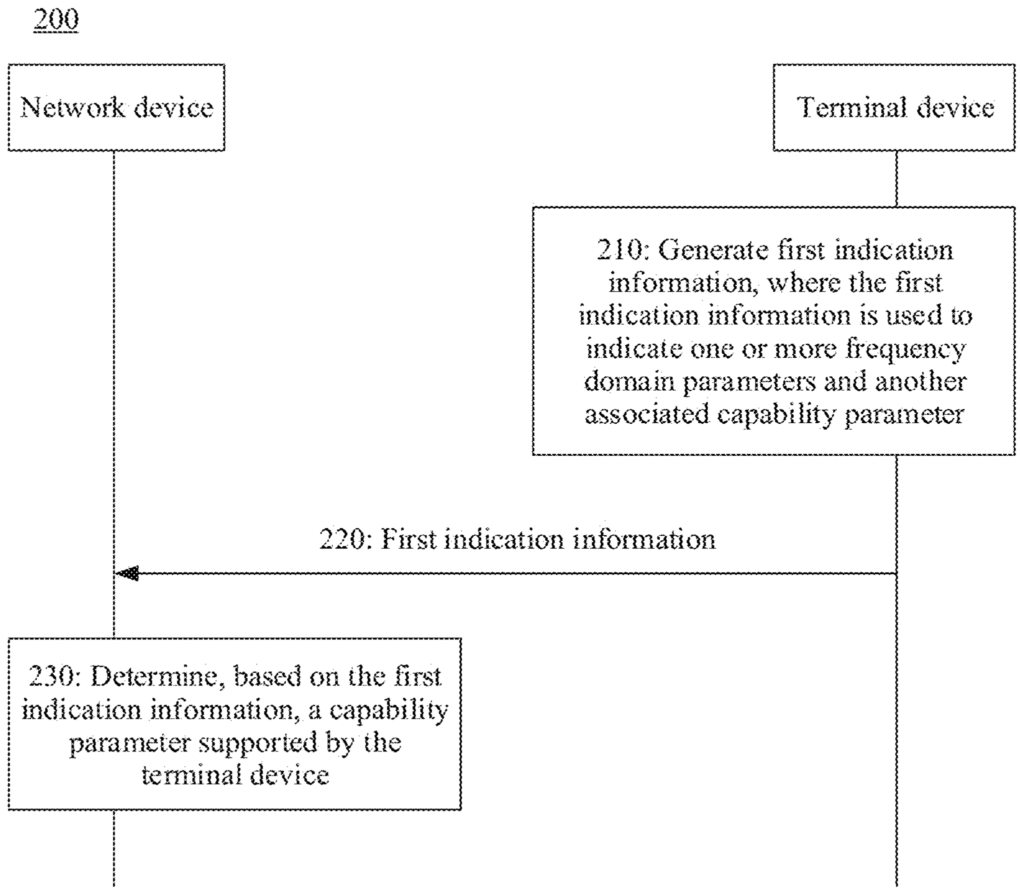
FIG. 4 is a schematic flowchart of a method for reporting a terminal device capability according to an embodiment of this application.

FIG. 4 is a schematic flowchart of a method 200 for reporting a terminal device capability according to an embodiment of this application from a perspective of device interaction. Specifically, FIG. 4 specifically shows a downlink signal or downlink channel transmission method. As shown in the figure, the method 200 shown in FIG. 4 may include step 210 to step 230. The following describes the method 200 in detail with reference to the accompanying drawing.

Step 210: A terminal device generates first indication information, where the first indication information is used to indicate one or more frequency domain parameters and one or more of the following capability parameters associated with each frequency domain parameter: a spatial domain parameter, a port quantity, a reference signal resource quantity, and a total port quantity.

The frequency domain parameter is a capability parameter of the terminal device in a frequency domain dimension. In other words, the frequency domain parameter is one capability parameter of the terminal device.

Each frequency domain parameter and the capability parameter associated with the frequency domain parameter may be used to indicate one combination of a plurality of capability parameters that can be simultaneously supported by the terminal device. When a network device configures CSI reporting for the terminal device, configured parameters need to satisfy at least one of the foregoing one or more capability parameter groups. Herein, that the configured parameters satisfy the capability parameter group may mean that the parameters configured by the network device respectively fall within value ranges of corresponding capability parameters in the capability parameter group.

For example, if the capability parameter group includes a frequency domain parameter N, a spatial domain parameter L, and a port quantity P, and the parameters configured by the network device include a frequency domain parameter $N_0$, a spatial domain parameter $L_0$, and a port quantity $P_0$, $N_0 \le N$, $L_0 \le L$, and $P_0 \le P$.

The following further describes the foregoing capability parameters.

1. The frequency domain parameter may be used to indicate a maximum quantity of first frequency domain units that can be supported by the terminal device. The first frequency domain unit herein is the PMI subband described above. The terminal device may perform channel measurement and PMI feedback based on a reference signal received on each first frequency domain unit. A PMI fed back by the terminal device may be used to determine a precoding matrix corresponding to each first frequency domain unit.

If the maximum quantity of first frequency domain units that can be supported by the terminal device is N, a quantity of first frequency domain units that is configured by the network device for the terminal device for PMI reporting should be less than or equal to N.

In an implementation, when indicating the frequency domain parameter by using the first indication information, the terminal device may directly indicate the maximum quantity N of first frequency domain units that can be supported by the terminal device.

In a possible design, the terminal device may select one or more values from a predefined set of optional values of the quantity of first frequency domain units, and indicate the one or more values or an index corresponding to the one or more values to the network device by using the first indication information.

The value in the predefined set of optional values of the quantity of first frequency domain units may be, for example, a quantity $N_3$ of first frequency domain units. The quantity $N_3$ of first frequency domain units may be determined by a product of a preconfigured quantity $N_{SB}$ of second frequency domain units and a preconfigured granularity ratio R'. For example, $N_3 = N_{SB} \times R'$.

Optionally, the optional value of the quantity of first frequency domain units may be a set listed below or a subset of the set listed below:

{1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38}.

For example, the subset of the set may be:

{20, 21, 22, 23, 24, 25, 26, 27, 28, 29, 30, 31, 32, 33, 34, 35, 36, 37, 38}.

Because it is already determined in a current protocol that the terminal device can support reporting of 19 first frequency domain units, it is considered by default that the terminal device needs to support at least 19 first frequency domain units. Although the subset shown above does not include values 1 to 19, it is considered by default that the terminal device can support the values 1 to 19. When the granularity ratio is greater than 1, for example, the granularity ratio is 2, the maximum quantity of first frequency domain units may be 38 (that is, 19×2) at most, but not all terminal devices can support the maximum quantity of first frequency domain units being greater than 19. Therefore, the subset shown above includes a total of 19 values from 20 to 38. The frequency domain parameter N reported by the terminal device may be one or more values in the subset.

For example, the subset of the set may alternatively be:

{14, 15, 16, 17, 18, 19, 20, 21, 22, 23, 24, 25, 26, 27, 28, 29, 30, 31, 32, 33, 34, 35, 36, 37, 38}.

Because in the current protocol, when $N_{SB} \times R' \le 13$, the terminal device needs to process a corresponding quantity of first frequency domain units, the terminal device needs to support at least 13 first frequency domain units. Although the subset shown above does not include values 1 to 13, it is considered by default that the terminal device can support the values 1 to 13. When $N_{SB} \times R' > 13$, the maximum quantity of first frequency domain units may be 38 at most, but not all terminal devices can support the maximum quantity of first frequency domain units being greater than 13. Therefore, the subset shown above includes a total of 25 values from 14 to 38. The frequency domain parameter N reported by the terminal device may be one or more values in the subset.

Optionally, the optional value of the quantity of first frequency domain units may be a set listed below or a subset of the set:

{1, 2, 3, 4, 5, 6, 7, 8, 9, 10, 11, 12, 13, 15, 16, 18, 20, 24, 25, 27, 30, 32, 36, 40}.

In a possible design, when the product of the quantity $N_{SB}$ of second frequency domain units and the granularity ratio R' is less than or equal to 13, that is, $N_{SB} \times R' \le 13$, a quantity $N_3$ of actually configured first frequency domain units is equal to $N_{SB}\times R'$. When the product of the quantity $N_{SB}$ of second frequency domain units and the granularity ratio R' is greater than 13, that is, $N_{SB}\times R'>13$, a quantity $N_3$ of actually configured first frequency domain units is a product of powers of 2, 3, and 5. The terminal device may change, in a manner such as zero padding or cropping, a quantity of actually processed frequency domain dimensions to $2^{\alpha}3^{\beta}5^{\gamma}$. α, β, and γ are any integers greater than or equal to 0.

Therefore, if the granularity ratio R' is 2, a quantity of second frequency domain units included in a reporting bandwidth is 19 at most. If two second frequency domain units at the edge of the reporting bandwidth are not divided, the reporting bandwidth may be divided into 36 first frequency domain units, and an optional value of $N_3$ may be 36. If two second frequency domain units at the edge of the reporting bandwidth are divided, the reporting bandwidth may be divided into 38 first frequency domain units, and an optional value of $N_3$ may be 40.

For example, the subset of the set may be: {1, 2, 3, 4, 5, 6, 7, 8, 9, 10, 11, 12, 13, 15, 16, 18, 20, 24, 25, 27, 30, 32, 36}.

For example, the subset of the set may alternatively be {20, 24, 25, 27, 30, 32, 36}.

Because it is already determined in a current protocol that the terminal device can support reporting of 19 first frequency domain units, the terminal device needs to support at least 19 first frequency domain units. Although the subset shown above does not include values 1 to 19, it is considered by default that the terminal device can support the values 1 to 19. When the granularity ratio is greater than 1, for example, the granularity ratio is 2, the maximum quantity of first frequency domain units may be 38 (that is, 19×2) at most, but not all terminal devices can support the maximum quantity of first frequency domain units being greater than 19. Therefore, the subset shown above includes a total of seven values from 20 to 36. The frequency domain parameter N reported by the terminal device may be one or more values in the subset.

For example, the subset of the set may alternatively be {15, 16, 18, 20, 24, 25, 27, 30, 32, 36}.

Because in the current protocol, when $N_{SB}\times R'\leq 13$, the terminal device needs to process a corresponding quantity of first frequency domain units, the terminal device needs to support at least 13 first frequency domain units. Although the subset shown above does not include values 1 to 13, it is considered by default that the terminal device can support the values 1 to 13. When $N_{SB}\times R'>13$, the maximum quantity of first frequency domain units may be 38 at most, but not all terminal devices can support the maximum quantity of first frequency domain units being greater than 13. Therefore, the subset shown above includes a total of 10 values from 15 to 36. The frequency domain parameter N reported by the terminal device may be one or more values in the subset.

The subset listed above may be applied to, for example, a scenario in which the two second frequency domain units at the edge of the reporting bandwidth are not divided.

For example, the subset of the set may alternatively be {20, 24, 25, 27, 30, 32, 36, 40}.

Because it is already determined in a current protocol that the terminal device can support reporting of 19 first frequency domain units, the terminal device needs to support at least 19 first frequency domain units. The subset shown above includes a total of eight values from 20 to 40. The frequency domain parameter N reported by the terminal device may be one or more values in the subset.

It should be noted that, although a value within a range from 1 to 19 is not reflected in the subset, it is considered by default that all terminal devices can support the value within the range from 1 to 19.

For example, the subset of the set may alternatively be {15, 16, 18, 20, 24, 25, 27, 30, 32, 36, 40}.

Because in the current protocol, when $N_{SB}\times R'\leq 13$, the terminal device needs to process a corresponding quantity of first frequency domain units, the terminal device needs to support at least 13 first frequency domain units. The subset shown above includes a total of 11 values from 15 to 40. The frequency domain parameter N reported by the terminal device may be one or more values in the subset.

It should be noted that, although a value within a range from 1 to 14 is not reflected in the subset, it is considered by default that all terminal devices can support the value within the range from 1 to 14.

The subset listed above may be applied to, for example, a scenario in which the two second frequency domain units at the edge of the reporting bandwidth are divided.

In another implementation, when indicating the frequency domain parameter by using the first indication information, the terminal device may also indicate a ratio R of a second granularity to a first granularity and a quantity of second frequency domain units that can be supported.

As described above, the quantity of first frequency domain units may be determined by $N_3=N_{SB}\times R'$. Therefore, the granularity ratio R that can be supported by the terminal device is reported, so that the maximum quantity N of first frequency domain units that can be supported by the terminal device may also be determined.

When reporting a value of the granularity ratio R that can be reported, the terminal device may determine the value based on a maximum value of the quantity of second frequency domain units. For example, if the maximum value of the quantity of second frequency domain units that is defined in the current NR protocol is 19, a value of R that can be supported by the terminal device may be determined based on a product of 19 and R. For example, if the maximum quantity of first frequency domain units that is supported by the terminal device may be greater than 19, R=2 may be reported. If the maximum quantity of first frequency domain units that is supported by the terminal device is less than or equal to 19, R=1 may be reported.

In still another implementation, when indicating the frequency domain parameter by using the first indication information, the terminal device may further indicate whether the terminal device supports a granularity ratio R being 2. Because a ratio of a second granularity to a first granularity that is defined in the current protocol is 1 or 2, when the terminal device indicates, by using the first indication information, whether the ratio R of the second granularity to the first granularity being 2 is supported, a value of the ratio R of the second granularity to the first granularity is implicitly indicated.

When the terminal device reports whether the granularity ratio R being 2 is supported, whether the granularity ratio R being 2 is supported may also be determined based on a maximum value of the quantity of second frequency domain units. A specific method for determining, based on the granularity ratio R supported by the terminal device, the maximum quantity N of first frequency domain units that is supported by the terminal device is described above by using an example. For brevity, details are not described herein again.

Further, the terminal device may further indicate, by using the first indication information, the maximum value of the quantity of second frequency domain units that can be supported by the terminal device.

As described above, the quantity of first frequency domain units may be determined by $N_3=N_{SB}\times R'$. Therefore, the terminal device may further indicate the quantity of second frequency domain units that can be supported, so that the network device determines, based on the value of R that is supported by the terminal device and the maximum value of the quantity of second frequency domain units that is supported by the terminal device, the maximum value N of the quantity of first frequency domain units that can be supported by the terminal device.

2. The spatial domain parameter may be specifically a maximum quantity of spatial domain vectors that can be supported by the terminal device. The spatial domain vector may be used for codebook generation. As described above, in a codebook generation process, an optimal sub-channel may be fitted by using a plurality of spatial domain vectors.

The spatial domain parameter is L, and L is a positive integer. In other words, the maximum quantity of spatial domain vectors that can be supported by the terminal device is L. Therefore, a reporting quantity of spatial domain vectors that is configured by the network device for the terminal device should be less than or equal to L. The reporting quantity of spatial domain vectors that is configured by the network device for the terminal device (or a quantity of spatial domain vectors) may also be referred to as a spatial domain parameter configured by the network device for the terminal device.

In addition, when a transport layer quantity C is greater than 2, the spatial domain vector used for codebook generation may be independent between transport layer, or may be independent between transport layer groups, or may be shared by a plurality of transport layers. This is not limited in this application. When the transport layer quantity C is greater than 2, the C transport layers belong to at least one transport layer group; each transport layer group includes one or more of the C transport layers; and C is a positive integer.

If the spatial domain vector used for codebook generation is independent between transport layer groups, the spatial domain vector used for codebook generation may be independently selected for each transport layer group. Quantities of spatial domain vector used for codebook generation may be different for a plurality of transport layer groups. The terminal device may separately report, for different transport layer groups, maximum quantities of spatial domain vectors that can be supported.

Assuming that a quantity of transport layer groups is 2, the terminal device may report, for different transport layer groups, maximum quantities $$\{L_1^g, L_2^g\}$$

of spatial domain vectors that can be supported.

$$L_1^g \text{ and } L_2^g$$

respectively correspond to a transport layer group 1 and a transport layer group 2.

$$L_1^g \text{ and } L_2^g$$

are both positive integers. The spatial domain parameter $$L_1^g$$

corresponding to the transport layer group 1 is used to indicate that a maximum quantity of spatial domain vectors that can be supported by the terminal device when the terminal device generates a codebook for each transport layer in the transport layer group 1 is $$L_1^g.$$

The spatial domain parameter $$L_2^g$$

corresponding to the transport layer group 2 is used to indicate that a maximum quantity of spatial domain vectors that can be supported by the terminal device when the terminal device generates a codebook for each transport layer in the transport layer group 2 is $$L_2^g.$$

If the spatial domain vector used for codebook generation is independent between transport layers, the spatial domain vector used for codebook generation may be independently selected for each transport layer. Quantities of spatial domain vector used for codebook generation may be different for a plurality of transport layers. The terminal device may separately report, for different transport layers, maximum quantities of spatial domain vectors that can be supported.

Assuming that a quantity of transport layers is 4, the terminal device may report, for different transport layers, maximum quantities $$\{L_1^c, L_2^c, L_3^c, L_4^c\}$$

of spatial domain vectors that can be supported.

$$L_1^c, L_2^c, L_3^c, \text{ and } L_4^c$$

respectively correspond to a transport layer group 1 and a transport layer group 2.

$$L_1^c, L_2^c, L_3^c, \text{ and } L_4^c$$

are all positive integers. The spatial domain parameter $$L_1^c$$

corresponding to a transport layer 1 is used to indicate that a maximum quantity of spatial domain vectors that can be supported by the terminal device when the terminal device generates a codebook for the transport layer 1 is $$L_1^c.$$

The spatial domain parameter $$L_2^c$$

corresponding to a transport layer 2 is used to indicate that a maximum quantity of spatial domain vectors that can be supported by the terminal device when the terminal device generates a codebook for each transport layer in the transport layer 2 is $$L_2^c.$$

The spatial domain parameter $$L_3^c$$

corresponding to a transport layer 3 is used to indicate that a maximum quantity of spatial domain vectors that can be supported by the terminal device when the terminal device generates a codebook for each transport layer in the transport layer 3 is $$L_3^c.$$

The spatial domain parameter $$L_4^c$$

corresponding to a transport layer 4 is used to indicate that a maximum quantity of spatial domain vectors that can be supported by the terminal device when the terminal device generates a codebook for each transport layer in the transport layer 4 is $$L_4^c.$$

If the spatial domain vector used for codebook generation may be shared by transport layers, spatial domain vectors used for codebook generation are the same for a plurality of transport layers. The terminal device may report, for the plurality of transport layers, only one maximum quantity of spatial domain vectors that can be supported. In this case, the maximum quantity of spatial domain vectors that can be supported by the terminal device when the terminal device generates a codebook for each transport layer is the reported spatial domain parameter.

3. The reference signal resource quantity may be specifically a maximum quantity of reference signal resources across all carriers (carrier component, CC, which may also be referred to as a carrier unit) simultaneously that can be supported by the terminal device. "All the carriers" herein may specifically refer to all carriers that can be supported by the terminal device. The network device may configure a reference signal resource across all the carriers supported by the terminal device. The term "simultaneously" herein may specifically mean that a plurality of aperiodic CSI reports are triggered by same downlink control information, and CSI measurement on a plurality of reference signal resources, bound to the aperiodic CSI reports, across all the carriers is also triggered "simultaneously". Specifically, when the network device may simultaneously trigger a plurality of aperiodic CSI reports by using one piece of downlink control information, for example, DCI, the UE is triggered to perform CSI measurement on reference signal resources bound to CSI reporting configurations of the plurality of aperiodic CSI reports. As described above, each CSI reporting configuration is bound to one reference signal resource set, and each reference signal resource set may include one or more reference signal resources. Therefore, one or more reference signal resources may be bound by configuring CSI reporting configurations of a plurality of aperiodic CSI reports. The terminal device may simultaneously receive, within a range of a capability of the terminal device, reference signals based on the plurality of reference signal resources configured in the CSI reporting configurations. Therefore, the quantity of reference signal resources across all the carriers simultaneously that can be supported by the terminal device may be specifically a maximum quantity of a group of reference signal resources, bound to CSI reports that can be simultaneously triggered, across all the carriers.

The reference signal resource quantity is denoted as Q, and Q is a positive integer. That is, the maximum quantity of reference signal resources across all the carriers simultaneously that can be supported by the terminal device is Q. In this case, it indicates that the terminal device can simultaneously receive the reference signals across all the carriers based on the Q reference signal resources. Therefore, a reference signal resource quantity configured by the network device across all the carriers supported by the terminal device should be less than or equal to the reference signal resource quantity Q.

4. The port quantity is defined based on one reference signal resource. The port quantity may be specifically a maximum quantity of ports in one reference signal resource across all the carriers simultaneously that is supported by the terminal device. "All the carriers" herein may specifically refer to all carriers that can be supported by the terminal device. The term "simultaneously" herein may specifically mean that a plurality of aperiodic CSI reports are triggered by same downlink control information, and CSI measurement on a plurality of reference signal resources, bound to the aperiodic CSI reports, with a plurality of port quantities across all the carriers is also triggered "simultaneously". The maximum quantity of ports in one reference signal resource across all the carriers simultaneously that is supported by the terminal device may specifically mean that when the network device simultaneously triggers a plurality of aperiodic CSI reports by using one piece of downlink control information, for example, DCI, a maximum value of a reference signal port quantity configured for one reference signal resource is determined by a reference signal port quantity configured for each reference signal resource in reference signal resources bound to CSI reporting configurations of the plurality of aperiodic CSI reports.

The network device may configure a reference signal resource across all the carriers supported by the terminal device. One reference signal port quantity may be configured for each reference signal resource. A maximum value of a reference signal port quantity configured for one reference signal resource may be determined based on a reference signal port quantity configured for each reference signal resource in a reference signal resource configured by the network device across all the carriers supported by the terminal device. The port quantity may also be used to determine a maximum port quantity for subsequent codebook generation. In other words, a maximum port quantity supported by a codebook does not exceed the port quantity. Therefore, a reference signal port quantity configured for any reference signal resource configured by the network device across all the carriers supported by the terminal device may be less than or equal to the maximum value.

The port quantity is denoted as P, and P is a positive integer. In other words, the maximum quantity of ports in one reference signal resource across all the carriers simultaneously that is supported by the terminal device is P. In this case, it indicates that when the terminal device receives a reference signal based on a plurality of reference signal resources across all the carriers, a port quantity for a reference signal received based on one reference signal resource does not exceed P. Therefore, a reference signal port quantity configured for any reference signal resource configured by the network device across all the carriers supported by the terminal device should be less than or equal to P.

Further, the reference signal resource quantity is denoted as Q, and the port quantity is denoted as P. That is, the maximum quantity of reference signal resources across all the carriers simultaneously that can be supported by the terminal device is Q, and a maximum port quantity for one reference signal resource configured in the Q reference signal resources is P. In this case, it indicates that the terminal device can receive a reference signal across all the carriers based on a maximum of Q reference signal resources, and a reference signal port quantity configured for any one of the Q reference signal resources does not exceed the port quantity P. In other words, a maximum value of a port quantity for a reference signal that can be received by the terminal device based on one reference signal resource is P. A maximum port quantity supported by the terminal device during subsequent codebook generation does not exceed P. Therefore, the reference signal resource quantity configured by the network device across all the carriers supported by the terminal device should be less than or equal to Q, and a reference signal port quantity configured for any configured reference signal resource should be less than or equal to P.

5. The total port quantity may be specifically a sum of quantities of ports across all the carriers simultaneously that can be supported by the terminal device. Alternatively, more specifically, the total port quantity may be a sum of supported quantities of ports in reference signal resources across all the carriers simultaneously that can be simultaneously supported by the terminal device.

"All the carriers" herein may specifically refer to all carriers that can be supported by the terminal device. The term "simultaneously" herein may specifically mean that a plurality of aperiodic CSI reports are triggered by same downlink control information, and CSI measurement on a plurality of reference signal resources, bound to the aperiodic CSI reports, with a plurality of port quantities across all the carriers is also triggered "simultaneously". The sum of supported quantities of ports in reference signal resources across all the carriers simultaneously that can be supported by the terminal device may specifically mean that when the network device simultaneously triggers a plurality of aperiodic CSI reports by using one piece of downlink control information, for example, DCI, the UE is triggered to perform the plurality of aperiodic CSI reports, and a sum of quantities of reference signal ports in reference signal resources bound to CSI reporting configurations of the plurality of aperiodic CSI reports simultaneously that can be supported is the total port quantity.

The network device may configure a reference signal resource across all the carriers supported by the terminal device. One reference signal port quantity may be configured for each reference signal resource. A sum of quantities of reference signal ports may be determined based on a reference signal port quantity configured for each reference signal resource in a reference signal resource configured by the network device across all the carriers supported by the terminal device.

The total port quantity is denoted as S, and S is a positive integer. That is, the sum of quantities of ports across all the carriers simultaneously that can be supported by the terminal device is S. Alternatively, more specifically, the sum of quantities of ports in the reference signal resources across all the carriers simultaneously that can be supported by the terminal device is S. In this case, it indicates that a port quantity for reference signals that can be simultaneously received by the terminal device across all the carriers based on a plurality of reference signal resources does not exceed S.

Further, the port quantity is P, the reference signal resource quantity is Q, and the total port quantity is S. That is, a maximum quantity of reference signal resources across all the carriers simultaneously that can be supported by the terminal device is Q, a maximum port quantity for a reference signal that can be received based on one reference signal resource is P, and a maximum port quantity for a reference signal that can be received based on the Q reference signal resources is S.

It should be understood that, for ease of understanding, the foregoing describes the capability parameters in this application in detail, but this shall not constitute any limitation on this application. For related descriptions of the foregoing capability parameters, refer to the conventional technology. For example, refer to related descriptions in the NR protocol TS 38.306. For brevity, details are not described herein. In addition, this application does not exclude a possibility of modifying the definition of the foregoing capability parameter in a future protocol.

In this embodiment of this application, the first indication information may be used to indicate one or more capability parameter groups. Each capability parameter group may include a plurality of associated parameters. The one or more capability parameter groups indicated by the first indication information may be one or more frequency domain parameters and one or more of the following parameters associated with the frequency domain parameter: a spatial domain parameter, a port quantity, a reference signal resource quantity, and a total port quantity. The association herein means that parameters can be combined for use. For example, a parameter and a port quantity that are associated with a frequency domain parameter may be a combination of the frequency domain parameter, a spatial domain parameter, and the port quantity.

A specific form in which terminal device reports the capability parameter is not limited in this application. The terminal device may report a plurality of associated capability parameters in a form of a capability parameter group or a capability parameter set, for example, {frequency domain parameter, spatial domain parameter, port quantity, reference signal resource quantity, total port quantity}, or {frequency domain parameter, spatial domain parameter, total port quantity}, or {frequency domain parameter, spatial domain parameter}. Examples are not listed herein one by one.

It should be noted that a capability parameter group or a capability parameter set is not a specific concept, and a plurality of associated capability parameters may be considered as one capability parameter group or capability parameter set. In an implementation, the terminal device may include a plurality of associated capability parameters in different fields of same signaling for reporting. For example, the frequency domain parameter and the spatial domain parameter are reported in a codebook parameter, and one or more of the port quantity, the reference signal resource quantity, and the total port quantity are reported in a supported CSI-RS resource list. The terminal device may alternatively include a plurality of associated capability parameters in different signaling for reporting.

When the terminal device reports only one frequency domain parameter and another capability parameter associated with the frequency domain parameter, it may be considered that the terminal device reports only one capability parameter group. Certainly, when reporting the frequency domain parameter and the another capability parameter associated with the frequency domain parameter, the terminal device does not necessarily perform reporting in a form of a capability parameter group. This is not limited in this application.

A specific form in which the terminal device reports a plurality of associated capability parameters is described in detail below with reference to a specific embodiment. For brevity, detailed descriptions of the content are omitted herein.

Step 220: The terminal device sends the first indication information. Correspondingly, in step 220, the network device receives the first indication information.

For example, the terminal device may include the first indication information in higher layer signaling. The higher layer signaling may be, for example, an RRC message. This is not limited in this application.

A specific process in which the network device includes the first indication information in the higher layer signaling, to indicate the one or more capability parameter groups to the network device may be the same as that in the conventional technology. For brevity, details are not described herein.

Step 230: The network device determines, based on the first indication information, the capability parameter supported by the terminal device.

The network device may determine, based on the one or more frequency domain parameters indicated by the terminal device in the first indication information and another capability parameter associated with each frequency domain parameter, a CSI measurement resource configuration parameter configured for the terminal device. For example, the spatial domain parameter L used for codebook generation, the reporting bandwidth (csi-ReportingBand), the ratio R' of the second granularity to the first granularity, and the reference signal resource bound to CSI reporting are determined. The reference resource quantity, the maximum port quantity, and the total port quantity satisfy the capability parameters reported by the terminal device.

For ease of description, in this embodiment of this application, one frequency domain parameter that can be supported by the terminal device and one or more of a spatial domain parameter, a port quantity, a reference signal resource quantity, and a total port quantity that correspond to the frequency domain parameter are grouped into one capability parameter group. One capability parameter group may include a frequency domain parameter and one or more of the following capability parameters: a spatial domain parameter, a port quantity, a reference signal resource quantity, and a total port quantity.

It should be understood that, the capability parameter group is defined only for ease of description, and shall not constitute any limitation on this application. When reporting these parameters, the terminal device does not necessarily report the parameters in a form of a capability parameter group.

Specifically, when the terminal device indicates one capability parameter group to the network device, the network device may configure a corresponding parameter for the terminal device based on each parameter in the capability parameter group. Each parameter configured by the network device should be less than or equal to a value reported by the terminal device in the capability parameter group. For example, the network device may determine, based on a frequency domain parameter in the capability parameter group, a value of a quantity of second frequency domain units and a granularity ratio R' that are configured for the terminal device in a reporting bandwidth. For another example, the network device may determine, based on a spatial domain parameter in the capability parameter group, a reporting quantity of spatial domain vectors used for codebook generation. For another example, the network device may determine, based on a port quantity in the capability parameter group, a reference signal port quantity that can be configured for one reference signal resource. For another example, the network device may determine, based on a total port quantity in the capability parameter group, a sum of reference signal port quantities that can be configured for a plurality of reference signal resources bound to CSI reporting configurations.

When the terminal device indicates a plurality of capability parameter groups to the network device, the network device may configure a corresponding parameter for the terminal device based on each parameter in the plurality of capability parameter groups. Each parameter configured by the network device only needs to be less than or equal to a corresponding value in one of the plurality of capability parameter groups.

It should be noted that some capability parameters in the plurality of capability parameter groups may be reused, but this does not affect the network device to determine a capability of the terminal device and configure a corresponding parameter. For example, when the frequency domain parameter is 40, the associated spatial domain parameter and port quantity may be 4 and 12, or may be 2 and 24, respectively. Therefore, the network device may determine a capability of the terminal device and configure a corresponding parameter based on two capability parameter groups {40, 4, 12} and {40, 2, 24}.

It should be understood that, a specific value of the capability parameter that is listed above is merely an example, and shall not constitute any limitation on this application.

With reference to specific examples, the following describes in detail several possible forms in which the terminal device reports one or more frequency domain parameters and another capability parameter associated with each frequency domain parameter, and a rule in which the network device configures a parameter based on the capability parameter reported by the terminal device.

It should be understood that, a capability parameter group listed below is merely an example, and shall not constitute any limitation on this application. In addition, for ease of understanding, a frequency domain parameter shown below is shown by using a maximum value of a quantity of first frequency domain units that can be supported by the terminal device. However, this does not mean that the terminal device necessarily reports the quantity of first frequency domain units. Alternatively, the maximum quantity of first frequency domain units that can be supported by the terminal device may be indirectly indicated through reporting in another manner listed above.

In an embodiment, the first indication information may be used to indicate one or more capability parameter groups, and each capability parameter group includes one frequency domain parameter and one spatial domain parameter and one port quantity that are associated with the frequency domain parameter. Each capability parameter group may be used to indicate one combination of a frequency domain parameter, a spatial domain parameter, and a port quantity that can be simultaneously supported by the terminal device during PMI reporting. For example, the capability parameter group may be shown in a form of {frequency domain parameter N, spatial domain parameter L, port quantity P} or an equivalent form thereof.

For example, the capability parameter group reported by the terminal device may include {40, 4, 12}, {20, 4, 24}, and {40, 2, 24}.

The network device may determine, based on the capability parameter group reported by the terminal device, that the terminal device does not support PMI feedback based on a 32-port type II codebook. Therefore, the network device does not trigger the terminal device to perform any CSI reporting bound to the type II codebook with a reference signal port quantity being 32. When a quantity of first frequency domain units that is configured by the network device in one CSI reporting configuration is greater than 20, and L=4, a port quantity for a reference signal resource that is associated with CSI reporting does not exceed 12. When a quantity of first frequency domain units that is configured by the network device in one CSI reporting configuration is any value (it should be understood that currently, a maximum value of the quantity of first frequency domain units that is supported in NR is 40), and L=2, a port quantity for a reference signal resource that is associated with CSI reporting does not exceed 24. When a quantity of first frequency domain units that is configured by a base station in one CSI reporting configuration is less than or equal to 20, and L=4, a port quantity for a reference signal resource that is associated with CSI reporting does not exceed 24.

The foregoing listed capability parameter group shows a case in which the spatial domain parameter is shared by a plurality of transport layers, or a transport layer quantity is 1. As described above, when the transport layer quantity is greater than 2, the spatial domain vector may be shared by transport layers, or may be independent between transport layers, or may be independent between transport layer groups.

Optionally, the first indication information is further used to indicate that when the transport layer quantity C is greater than 2, the spatial domain vector used for codebook generation supports sharing by transport layer, independence between transport layers, or independence between transport layer groups.

If the spatial domain parameter is independent between transport layers or transport layer groups, the foregoing listed capability parameter group may be further extended.

For example, the capability parameter group may be shown in a form of {quantity N of first frequency domain units, {spatial domain parameter $$L_1^c,$$

spatial domain parameter $$L_2^c,$$

spatial domain parameter $$L_3^c,$$

spatial domain parameter $$L_4^c\},$$

port quantity P} or an equivalent form thereof. The spatial domain parameter in the capability parameter group is independent between transport layers.

For example, the capability parameter group reported by the terminal device may include {38, {4, 4, 4, 4}, 12} and {19, {4, 4, 2, 2}, 24}.

{4, 4, 4, 4} indicates that a maximum quantity of spatial domain vectors that can be supported by the terminal device when the terminal device generates a codebook for each of transport layers 1, 2, 3, and 4 is 4. {4, 4, 2, 2} indicates that a maximum quantity of spatial domain vectors that can be supported by the terminal device when the terminal device generates a codebook for each of transport layers 1 and 2 is 4, and a maximum quantity of spatial domain vectors that can be supported by the terminal device when the terminal device generates a codebook for each of transport layers 3 and 4 is 2.

For example, the capability parameter group may alternatively be shown in a form of {frequency domain parameter N, {spatial domain parameter $$L_1^g,$$

spatial domain parameter $$L_2^g\},$$

port quantity P} or an equivalent form thereof. The spatial domain parameter in the capability parameter group may be independent between transport layer groups.

For example, the capability parameter group reported by the terminal device may include {38, {4, 4}, 12} and {19, {4, 2}, 24}.

{4, 4} indicates that a maximum quantity of spatial domain vectors that can be supported by the terminal device when the terminal device generates a codebook for each transport layer in each of a transport layer group 1 and a transport layer group 2 is 4. {4, 2} indicates that a maximum quantity of spatial domain vectors that can be supported by the terminal device when the terminal device generates a codebook for each transport layer in a transport layer group 1 is 4, and a maximum quantity of spatial domain vectors that can be supported by the terminal device when the terminal device generates a codebook for each transport layer in a transport layer group 2 is 2.

Further, the capability parameter group may alternatively be shown in a form of {frequency domain parameter N, total spatial domain parameter quantity $L_{sum}$, port quantity P} or an equivalent form thereof. The total spatial domain parameter quantity $L_{sum}$ may be determined based on different cases. For example, if the spatial domain vector is independent between transport layers, $$L_{sum} = \sum_{i=1}^{C} L_i^c;$$

or if the spatial domain vector is independent between the transport layers, $$L_{sum} = \sum_{i=1}^{G} L_i^g.$$

C represents a transport layer quantity, G represents a transport layer group quantity, $$L_i^c$$

represents a maximum quantity of spatial domain vectors during codebook generation for an $i^{th}$ transport layer, $$L_i^g$$

represents a maximum quantity of spatial domain vectors during codebook generation for each transport layer in an $i^{th}$ transport layer group, and C, G, $$L_i^c, \text{ and } L_i^g$$

are all positive integers.

For example, the terminal device may report {38, 8, 12} and {19, 6, 24}.

According to the capability parameter set, when the quantity of first frequency domain units that is configured by the network device is greater than 19, the maximum port quantity for the bound reference signal resource cannot be greater than 12. If a codebook is generated based on independence between transport layer groups, 8 represents a sum of maximum quantities of spatial domain vectors on a plurality of transport layer groups. Assuming that the transport layers 1 and 2 belong to the transport layer group 1, the transport layers 3 and 4 belong to the transport layer group 2, a maximum quantity of spatial domain vectors used for codebook generation for each transport layer in the transport layer group 1 that is supported by the terminal device is $$L_1^g,$$

and a maximum quantity of spatial domain vectors used for codebook generation for each transport layer in the transport layer group 2 that is supported by the terminal device is $$L_1^g, L_1^g + L_2^g \le 8.$$

Because values of the spatial domain parameters determined in the current NR protocol are 4 and 2, the maximum quantities of spatial domain vectors that are supported by the terminal device when the terminal device generates a codebook for the transport layers 1, 2, 3, and 4 are 4, 4, 4, and 4. When the quantity of first frequency domain units that is configured by the network device is less than or equal to 19, the port quantity for the bound reference signal resource cannot be greater than 24. The maximum quantities of spatial domain vectors that are supported by the terminal device when the terminal device generates a codebook for the transport layers 1, 2, 3, and 4 is 4, 4, 2, and 2, or 2, 2, 4, and 4.

It should be understood that, for ease of understanding above, only an example in which the transport layer quantity is 4 and the transport layer group quantity is 2 is used, to show possible forms of the capability parameter group when the spatial domain vector is shared by transport layers, the spatial domain vector is independent between transport layers, and the spatial domain vector is independent between transport layer groups. However, this shall not constitute any limitation on this application. The transport layer quantity and the transport layer group quantity are not limited in this application.

In another embodiment, the first indication information may be used to indicate one or more capability parameter groups, each capability parameter group includes one frequency domain parameter and one spatial domain parameter associated with the frequency domain parameter, and the frequency domain parameter and the spatial domain parameter are associated with one port quantity. Each capability parameter group may be used to indicate one combination of a frequency domain parameter, a spatial domain parameter, and a port quantity that can be simultaneously supported by the terminal device during PMI reporting.

For example, the capability parameter group may be shown in a form of {frequency domain parameter $N_p$, spatial domain parameter $L_p$} or an equivalent form thereof. A subscript p represents an index of a corresponding reference signal port. For example, indexes of reference signal port quantities may be 0, 1, 2, 3, 4, and 5, and the reference signal port quantities corresponding to the indexes may be 4, 8, 12, 16, 24, and 32. For ease of understanding, the following example is described based on a correspondence between an index and a port quantity. It should be understood that, the correspondence between an index of a reference signal port and the reference signal port quantity that is listed herein is merely an example, and shall not constitute any limitation on this application.

For example, the capability parameter group reported by the terminal device may include $\{N_0=38, L_0=4\}$, $\{N_1=38, L_1=4\}$, $\{N_3=20, L_3=4\}$, and $\{N_4=20, L_4=2\}$.

The network device may determine, based on the capability parameter group reported by the terminal device, that when reference signals of four ports or eight ports are measured, the maximum quantity of second frequency domain units that is configured in the reporting bandwidth is 19, the ratio R' of the second granularity to the first granularity may be 1 or 2, and the spatial domain parameter can be set to 4 at most.

When reference signals based on 12 ports or 16 ports are measured, a product of the quantity of second frequency domain units that is configured in the reporting bandwidth and 2 (that is, a maximum value of R) may be set to 20 at most. For example, when the quantity of second frequency domain units that is configured in the reporting bandwidth is 19, R may be 1; or when the quantity of second frequency domain units that is configured in the reporting bandwidth is 9, R may be 1 or 2. When reference signals based on 12 ports are measured, the spatial domain parameter can be set to 4 at most. When reference signals based on 16 ports are measured, the spatial domain parameters can be set to 2 at most.

In addition, the network device may determine that the UE does not support PMI measurement and reporting, based on the type II codebook, of reference signals based on 24 ports or 32 ports.

It should be understood that, the foregoing listed spatial domain parameter may be extended into a plurality of values that are independent between transport layers or independent between transport layer groups. For details, refer to the foregoing embodiment. For brevity, details are not described herein again.

In still another embodiment, the first indication information may be used to indicate one or more first capability parameter groups and one or more second capability parameter groups. Each first capability parameter group includes one frequency domain parameter and one spatial domain parameter associated with the frequency domain parameter; each second capability parameter group includes one port quantity, one reference signal resource quantity, and one total port quantity; each first capability parameter group is associated with at least one second capability parameter group; and a plurality of capability parameters in a same first capability parameter group are associated, and a plurality of capability parameters in a same second capability parameter group are associated. It should be understood that, one first capability parameter group may be associated with one or more second capability parameter groups. Capability parameters in a plurality of second capability parameter groups associated with a same first capability parameter group may be partially duplicate, but at least one of them is different.

Specifically, for example, the first capability parameter group may be shown in a form of {frequency domain parameter $N_p$, spatial domain parameter $L_p$} or an equivalent form thereof. The second capability parameter group may be shown in a form of {port quantity P, reference signal resource quantity Q, total port quantity S} or an equivalent form thereof. A subscript p represents an index of a corresponding reference signal port.

For example, the first capability parameter group reported by the terminal device may include $\{N_0=38, L_0=4\}$ and/or $\{N_1=38, L_1=2\}$, and the second capability parameter group reported by the terminal device may include {4, 16, 64} and/or {8, 4, 30}.

As described above, the indexes 0, 1, 2, 3, 4, and 5 of the reference signal port quantities correspond to the port quantities 4, 8, 12, 16, 24, and 32. Therefore, the indexes 0 and 1 correspond to the port quantities 4 and 8, that is, port quantities in the two second parameter groups listed above. Therefore, the two first parameter groups and the two second parameter groups listed above may be associated by using the correspondence between a port quantity and an index.

A specific form in which the terminal device reports the first capability parameter group and the second capability parameter group is not limited to the foregoing listed form. For example, the first capability parameter group and the second capability parameter group that are reported by the terminal device may alternatively be shown in an associated form, for example, $\{\{N_0=38, L_0=4\}, \{4, 16, 64\}\}$ and $\{\{N_1=38, L_1=2\}, \{8, 4, 30\}\}$. A specific form in which the terminal device reports the first capability parameter group and the second capability parameter group is not limited in this application.

Optionally, the first indication information is further used to indicate that when the transport layer quantity C is greater than 2, the spatial domain vector used for codebook generation by the terminal device supports sharing by transport layer, independence between transport layers, or independence between transport layer groups.

If the spatial domain parameter is independent between transport layers or transport layer groups, the foregoing listed capability parameter group may be further extended.

For example, the capability parameter group reported by the terminal device may include $\{N_0=38, \{4, 4, 4, 4\}\}$, $\{N_1=38, \{2, 2, 2, 2\}\}$, {4, 16, 64}, and {8, 4, 30}.

Based on the capability parameter group reported by the terminal device, when the network configures, for the terminal device, one or more of a reporting bandwidth, a ratio of the second granularity to the first granularity, a spatial domain parameter, a reference signal resource, and a port quantity for the reference signal resource, it needs to be ensured that the parameter falls within a range of the capability reported by the terminal device. That is, a configured value of each item is less than or equal to a value of a corresponding item reported by the terminal device.

For example, if it is determined based on a related parameter (for example, a quantity of subbands configured in the reporting bandwidth and the ratio of the second granularity to the first granularity) in the CSI reporting configuration triggered by the network device that the quantity of first frequency domain units is 24, a quantity of spatial domain vectors used for codebook generation that is configured for the transport layers 1, 2, 3, and 4 is 4, and a port quantity for the bound reference signal resource is 8, the CSI reporting configuration is beyond the range of the capability of the terminal device. The CSI reporting configuration is a set of incorrect configuration parameters.

For another example, if it is determined based on a related parameter (for example, a quantity of subbands configured in the reporting bandwidth and the ratio of the second granularity to the first granularity) in the CSI reporting configuration triggered by the network device that the quantity of first frequency domain units is 15, a quantity of spatial domain vectors used for codebook generation that is configured for the transport layers 1, 2, 3, and 4 is 4, and a port quantity for the bound reference signal resource is 4, the CSI reporting configuration falls within the range of the capability of the terminal device. The CSI reporting configuration may be configured for the terminal device. It should be noted that the index p of the reference signal port quantity may be reported to the network device as a part of information reported by the terminal device, or the capability parameter may be reported by using a default rule, without additionally reporting the index p of the reference signal port quantity to the network device. For example, the port quantity indicated by the index p of the reference signal port quantity herein is an index corresponding to the largest port quantity P in all port quantities P in all the second capability parameter groups in the capability parameter groups reported by the terminal device. For example, the first capability parameter group reported by the terminal device may include {$N_p$=38, $L_p$=2} and {$N_p$=19, $L_p$=4}, and the second capability parameter group reported by the terminal device may include {4, 16, 64}, {8, 4, 30}, and {16, 4, 64}.

It can be learned that in the port quantities 4, 8, and 16 indicated in the second capability parameter group, 16 is the largest port quantity, that is, p should be 3, that is, an index corresponding to the port quantity 16. In other words, when the port quantity is less than or equal to 16, both the frequency domain parameter and the spatial domain parameter in the first capability parameter group can be used. In other words, either of the two first capability parameter groups reported by the terminal device and any one of the three second capability parameter groups reported by the terminal device may be combined for use. Specifically, the following six combinations may be included: {{38, 2}, {4, 16, 64}}; {{38, 2}, {8, 4, 30}}; {{38, 2}, {16, 4, 64}}; {{19, 4}, {4, 16, 64}}; {{19, 4}, {8, 4, 30}}; and {{19, 4}, {16, 4, 64}}.

It should be understood that, the foregoing listed six combinations are merely examples for ease of understanding, and shall not constitute any limitation on this application.

It should be further understood that, a form of the first indication information indicating the first capability parameter group and the second capability parameter group in the foregoing example is merely an example, and shall not constitute any limitation on this application. Based on the capability parameter reported by the terminal device, when the network configures, for the terminal device, one or more of a reporting bandwidth, a granularity ratio, a quantity of spatial domain vectors, a reference signal resource, and a port quantity for the reference signal resource, it needs to be ensured that the parameter falls within the range of the capability reported by the terminal device. That is, a configured value of each item is less than or equal to a value of a corresponding item reported by the terminal device.

For example, if it is determined based on a related parameter (for example, a quantity of subbands configured in the reporting bandwidth and the ratio of the second granularity to the first granularity) in the CSI reporting configuration triggered by the network device that the quantity of first frequency domain units is 24, the quantity of spatial domain vectors is 4, and a port quantity for the bound reference signal resource is 8, because the quantity of spatial domain vectors is beyond the range 2 of the spatial domain parameter, the CSI reporting configuration is beyond the range of the capability of the terminal device, and is a set of incorrect configuration parameters.

For another example, if it is determined based on a related parameter (for example, a quantity of subbands configured in the reporting bandwidth and the ratio of the second granularity to the first granularity) in the CSI reporting configuration triggered by the network device that the quantity of first frequency domain units is 24, the quantity of spatial domain vector is 4, and a port quantity for the bound reference signal resource is 4, because the terminal device does not report a capability parameter associated with the port quantity 4, this means that the terminal device can support all possible configurations of the quantity of first frequency domain units and the quantity of spatial domain vectors. That is, the network device may set, for the terminal device, the quantity of first frequency domain units to 24, the quantity of spatial domain vectors to 4, and the port quantity for the bound reference signal resource to 4.

In still another embodiment, when being used to indicate the frequency domain parameter, the first indication information specifically indicates whether the maximum quantity N of first frequency domain units that is supported by the terminal device satisfies that $N \le N_0$; and $N_0$ is a preset threshold. In addition, the first indication information is further used to indicate one or more capability parameter groups simultaneously supported when $N \le N_0$, and one or more capability parameter groups simultaneously supported when $N > N_0$. Each capability parameter group includes one spatial domain parameter and one port quantity that can be simultaneously supported by the terminal device. When the first indication information indicates the frequency domain parameter by indicating whether the maximum quantity N of first frequency domain units that is supported by the terminal device satisfies that $N \le N_0$, one or more optional values that are of the maximum quantity of first frequency domain units and that can be supported by the terminal device when N satisfies that $N \le N_0$ and a plurality of optional values that are of the maximum quantity of first frequency domain units and that can be supported by the terminal device when N does not satisfy that $N \le N_0$ (or N satisfies that $N > N_0$) may be predefined in a protocol.

Optionally, the preset threshold $N_0$ is 19. In other words, when the quantity N of first frequency domain units that can be supported by the terminal device is less than or equal to 19, a plurality of optional values of N may be predefined in the protocol. When the quantity N of first frequency domain units that can be supported by the terminal device is greater than 19, a plurality of optional values of N may be predefined in the protocol. The foregoing step 210 lists a plurality of optional values of the maximum quantity N of first frequency domain units that can be supported by the terminal device when $N \le 19$ and when $N > 19$. For brevity, examples are not listed herein one by one for description.

In correspondence to different values of N, the first indication information may further indicate the spatial domain parameter and the port quantity that are associated with each frequency domain parameter. For example, when $N \le 19$, one or more groups of associated spatial domain parameters and port quantities are indicated. When $N > 19$, one or more groups of associated spatial domain parameters and port quantities are indicated. For example, the capability parameter group indicated by the first indication information may be shown in a form of {spatial domain parameter L, port quantity P} or an equivalent form thereof.

In an implementation, when indicating that the quantity N of first frequency domain units that can be supported by the terminal device is less than or equal to $N_0$, the first indication information may further indicate whether the terminal device supports highly complex PMI feedback. When the quantity N of first frequency domain units that can be supported by the terminal device is greater than $N_0$, the first indication information may further indicate whether the terminal device supports highly complex PMI feedback. The highly complex PMI feedback is feedback based on high-dimensional space. For example, a corresponding capability parameter may include {6, 16}, {4, 16}, and {4, 32}. In this way, spatial domain parameters and port quantities that are supported by the terminal device in the case of different values of the frequency domain parameter are reported to the network device.

It should be understood that, an optional value of N that is determined based on a relationship between N and $N_0$ may form a plurality of possible combinations with the spatial domain parameter and the port quantity that are supported.

It should be further understood that, the foregoing listed capability parameters supported by the highly complex PMI feedback are merely examples, and shall not constitute any limitation on this application. It should be further understood that, the foregoing listed preset threshold is merely an example, and shall not constitute any limitation on this application.

In still another embodiment, when being used to indicate the frequency domain parameter, the first indication information specifically indicates whether the terminal device supports the granularity ratio R being 2. The first indication information may further indicate a maximum quantity of second frequency domain units and a spatial domain parameter that can be simultaneously supported.

As described above, $N_3=N_{SB}\times R$. In this case, the terminal device may report the maximum quantity of second frequency domain units and the granularity ratio that can be supported, to indirectly indicate the maximum quantity of first frequency domain units that can be supported by the terminal device.

In correspondence to different values of the maximum quantity of second frequency domain units, the first indication information may further indicate a spatial domain parameter associated with each value of the maximum quantity of second frequency domain units. For example, the first indication information may indicate, in a form of {maximum quantity $N_{SB}'$ of second frequency domain units, spatial domain parameter L} or an equivalent form thereof, the maximum quantity of second frequency domain units and the associated spatial domain parameter. For ease of distinguishing from the quantity $N_{SB}$ of second frequency domain units that is configured by the network device, herein, the maximum quantity of second frequency domain units that can be supported and that is reported by the terminal device is represented by $N_{SB}'$.

Further, the first indication information may further indicate a port quantity, a reference signal resource quantity, and a total port quantity that correspond to the maximum quantity of second frequency domain units and the spatial domain parameter. In a possible implementation, when the first indication information indicates the spatial domain parameter associated with the value of the maximum quantity of second frequency domain units, the port quantity may be associated in a form of {maximum quantity $N_{SBp}'$ of second frequency domain units, spatial domain parameter $L_p$} or an equivalent form thereof. A function of the subscript p is similar to that described in the foregoing embodiment. For brevity, details are not described herein again.

In addition, the first indication information may further indicate, in a form of {port quantity P, reference signal resource quantity Q, total port quantity S} or an equivalent form thereof, the port quantity, the reference signal resource, and the total port quantity that can be supported by the terminal device. A specific method for associating the port quantity, the reference signal resource quantity, and the total port quantity by using the subscript p has been described in detail in the foregoing embodiment. For brevity, details are not described herein again.

For example, the terminal device reports that R=2 is supported, and reports {$N_{SB0}'=19$, $L_0=4$}, {$N_{SB1'}=19$, $L_1=4$}, {$N_{SB2'}=10$, $L_2=4$}, and {$N_{SB3'}=10$, $L_3=2$}. Based on the capability parameter reported by the terminal device, when the network device configures the terminal device to perform PMI measurement and reporting based on the type II codebook, when measurement is performed based on reference signals of four ports or eight ports, the maximum quantity of second frequency domain units that is configured in the reporting bandwidth is 19, R' may be set to 1 or 2, and the quantity of spatial domain vectors may be set to 4 at most. When measurement is performed based on reference signals of 12 ports or 16 ports, the maximum quantity of second frequency domain units that is configured in the reporting bandwidth is 10, R' may be set to 1 or 2, and the quantity of spatial domain vectors may be set to 4 at most when measurement is performed based on CSI-RSs of 12 ports, and may be set only to 2 at most when measurement is performed based on 16 ports. In addition, the network device may determine that the terminal device does not support PMI measurement and reporting, based on the type II codebook, of reference signals based on 24 ports or 32 ports.

It can be learned from the foregoing plurality of listed embodiments that the terminal device reports the frequency domain parameter to the network device, and the network device may configure, for the terminal device based on the frequency domain parameter, the reporting bandwidth and the ratio R' of the second granularity to the first granularity. Within the range allowed by the capability of the terminal device, the network device may configure a first frequency domain unit at a smaller granularity for the terminal device, so that the terminal device performs channel measurement and PMI reporting on the first frequency domain unit at a smaller granularity, to obtain a more accurate PMI. Beyond the range of the capability of the terminal device, the network device may select a first frequency domain unit at a larger granularity, so that the terminal device performs channel measurement and PMI estimation on the first frequency domain unit at a larger granularity, to ensure that a parameter configured by the network device falls within the range of the capability of the terminal device, and avoid a failure to obtain feedback of the terminal device due to incorrect parameter configuration. Therefore, the network device can precode, based on a channel state fed back by the terminal device, data by using a precoding matrix matching the channel state, and then transmit the data, thereby improving data transmission performance, and helping improve system performance.

In the foregoing embodiment, in consideration of precision of PMI feedback, reporting of the capability parameter helps the network device configure the first frequency domain unit in the reporting bandwidth for the terminal device. Actually, PMI estimation further requires a sufficient reserved time. If the reserved time is excessively short, channel measurement cannot be completed, and PMI feedback cannot be performed either. Consequently, the network device cannot obtain PMI feedback of the terminal device.

Therefore, this application further provides a method, to reserve a sufficient time for PMI estimation.

Figure 5:
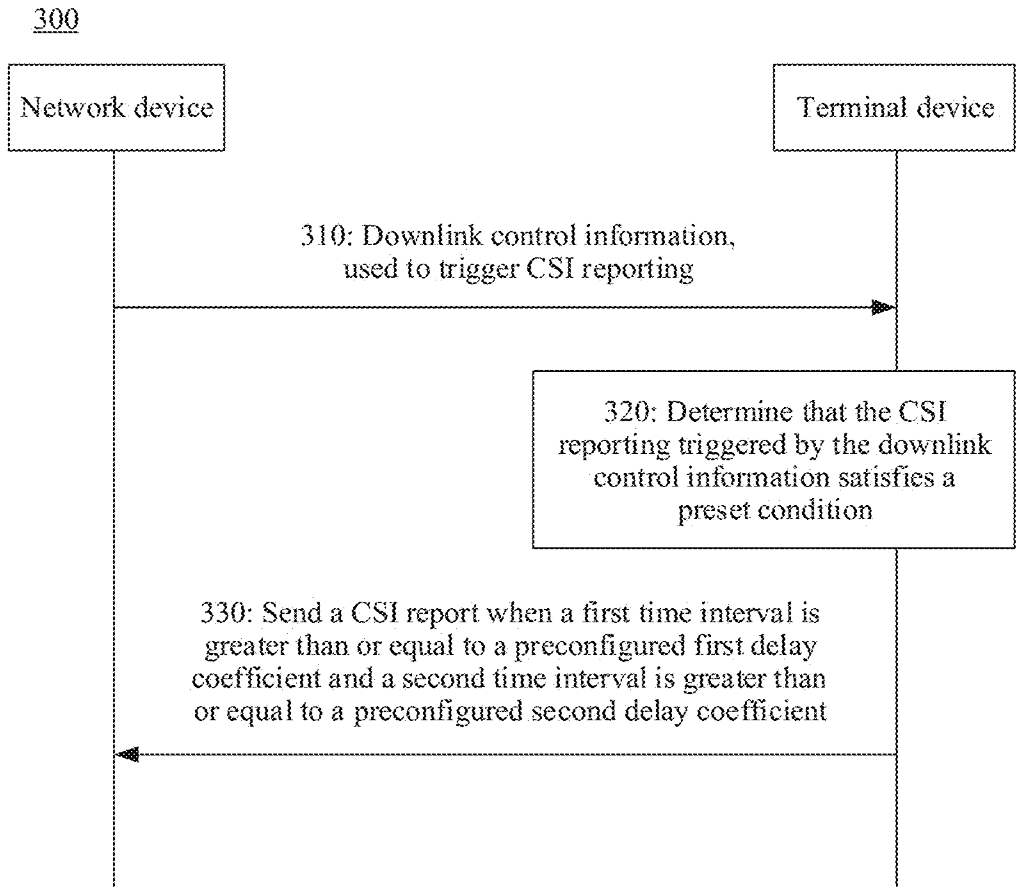
FIG. 5 is a schematic flowchart of a method for sending and receiving a CSI report according to another embodiment of this application.

FIG. 5 is a schematic flowchart of a method 300 according to another embodiment of this application from a perspective of device interaction. As shown in the figure, the method 300 may include step 310 to step 330. The following describes the steps in the method 300 in detail.

Step 310: A terminal device receives downlink control information, where the downlink control information triggers one or more CSI reports. Correspondingly, in step 310, a network device sends the downlink control information, to trigger one or more CSI reports.

Specifically, the downlink control information may be DCI (downlink control information) transmitted by using a physical downlink control channel (physical downlink control channel, PDCCH). The downlink control information may trigger one or more CSI reports at a time. A specific method in which the network device sends the downlink control information to the terminal device to trigger the one or more CSI reports may be the same as that in the conventional technology. For brevity, details are not described herein.

Step 320: The terminal device determines that the CSI report triggered by the downlink control information satisfies a preset condition.

Specifically, the preset condition may include:

the CSI reporting is subband CSI reporting;

a codebook used for PMI reporting is a type II codebook;

a plurality of reference signal resources are configured for the CSI reporting; or a port quantity configured for a reference signal resource used for the CSI reporting is greater than or equal to 4.

In other words, when the CSI report triggered by the downlink control information satisfies one of the foregoing listed preset conditions, it may be considered that the CSI report triggered by the downlink control information satisfies the preset condition.

Step 330: The terminal device sends a CSI report when a first time interval is greater than or equal to a preconfigured first delay coefficient and a second time interval is greater than or equal to a preconfigured second delay coefficient. Correspondingly, the network device receives the CSI report when the first time interval is greater than or equal to the preconfigured first delay coefficient and the second time interval is greater than or equal to the preconfigured second delay coefficient.

The first delay coefficient is $Z_2$ symbols, the second delay coefficient is $Z_2'$ symbols, and values of $Z_2$ and $Z_2'$ are shown in the following Table 2:

TABLE 2

| μ | $Z_2$ (symbols) | $Z'_2$ (symbols) |
|---|---|---|
| 0 | $\lceil 40\alpha_0 \rceil$ | $\lceil 37\beta_0 \rceil$ |
| 1 | $\lceil 72\alpha_1 \rceil$ | $\lceil 69\beta_1 \rceil$ |
| 2 | $\lceil 141\alpha_2 \rceil$ | $\lceil 140\beta_2 \rceil$ |
| 3 | $\lceil 152\alpha_3 \rceil$ | $\lceil 140\beta_3 \rceil$ |

$\mu$ is an index, each index is used to indicate one parameter set, the parameter set includes a subcarrier spacing and a cyclic prefix type, and in the case of different values, $\mu$ satisfies that $\alpha_\mu \geq 1$ and $\beta_\mu \geq 1$.

Optionally, when a granularity ratio R' configured by the network device is equal to 1, $\alpha_\mu = \beta_\mu = 1$; or when a granularity ratio R' configured by the network device is equal to 2, $\alpha_\mu > 1$, and $\beta_\mu > 1$. For example, $\beta_\mu = 1.6$, and $\beta_\mu = 1.8$.

Optionally, when the granularity ratio R' configured by the network device is equal to 1, $\beta_\mu = \beta_\mu = 1$; when the granularity ratio R' configured by the network device is equal to 2 and a product of a quantity $N_{SB}$ of second frequency domain units and R' that are configured by the network device (that is, $N_{SB} \times R'$) is less than or equal to a second preset threshold (for example, 20), $\alpha_\mu = \beta_\mu = 1$; or when a ratio R of a second granularity to a first granularity is equal to 2 and a product of a quantity $N_{sb}$ of second frequency domain units and R' (that is, $N_{SB} \times R'$) is greater than the second preset threshold, $\beta_\mu > 1$, and $\beta_\mu > 1$. For example, $\beta_\mu = 1.6$, and $\beta_\mu = 1.8$.

For ease of distinguishing from the granularity ratio R that can be supported and that is reported by the terminal device, the granularity ratio configured by the network device is denoted as R'.

It should be understood that, values of $\alpha_\mu$ and $\beta_\mu$ that are listed above in different cases are merely examples, and shall not constitute any limitation on this application.

It should be further understood that, values of $Z_2$ and $Z_2'$ in Table 2 may replace the values of $Z_2$ and $Z_2'$ in Table 1, and form a new table (Table 3) with $Z_1$, $Z_1'$, $Z_3$, and $Z_3'$ as follows:

TABLE 3

| | $Z_1$ (symbols) | | $Z_2$ (symbols) | | $Z_3$ (symbols) | |
|---|---|---|---|---|---|---|
| μ | $Z_1$ | $Z'_1$ | $Z_2$ | $Z'_2$ | $Z_1$ | $Z'_1$ |
| 0 | 22 | 16 | $\lceil 40\alpha_0 \rceil$ | $\lceil 37\beta_0 \rceil$ | 22 | $X_1$ |
| 1 | 33 | 30 | $\lceil 72\alpha_1 \rceil$ | $\lceil 69\beta_1 \rceil$ | 33 | $X_2$ |
| 2 | 44 | 42 | $\lceil 141\alpha_2 \rceil$ | $\lceil 140\beta_2 \rceil$ | $\min(44, X_3 + KB_1)$ | $X_3$ |
| 3 | 97 | 85 | $\lceil 152\alpha_3 \rceil$ | $\lceil 140\beta_3 \rceil$ | $\min(97, X_4 + KB_2)$ | $X_4$ |

It can be learned that in this embodiment of this application, the delay coefficients $Z_2$ and $Z_2'$ may be further increased, by using different coefficients, based on different values of a granularity ratio' configured by the network device, to match different calculation amounts of the terminal device in the case of different configured values. Therefore, it is more flexible and appropriate.

Optionally, the method further includes:

When the first time interval is less than the first delay coefficient, the terminal device determines that an uplink transmission resource for the CSI report triggered by the downlink control information is not used to transmit HARQ information or a transport block; and the terminal device cancels sending of the CSI report.

In other words, if the first time interval is less than the first delay coefficient, and the physical uplink resource, for example, a physical uplink shared channel (physical uplink shared channel, PUSCH), used for the CSI reporting is not used to transmit the HARQ information or uplink data, the terminal device may ignore triggering of the CSI report by the downlink control information, and skip sending the CSI report.

The terminal device cancels sending of the CSI, so that power can be saved. In addition, because there is no uplink data or HARQ information that needs to be sent, cancelation of sending of the CSI report by the terminal device does not involve additional rate matching.

Optionally, the method further includes:

When the second time interval is less than the second delay coefficient, the terminal device determines that the downlink control information triggers one CSI report, and an uplink transmission resource for the CSI report triggered by the downlink control information is not used to transmit HARQ information or a transport block; and the terminal device cancels sending of the CSI report.

In other words, if the second time interval is less than the second delay coefficient, the downlink control information triggers only one CSI report, and a physical uplink resource, for example, a PUSCH, used for the CSI report is not used to transmit the HARQ information or uplink data, the terminal device may ignore triggering of the CSI report by the downlink control information, and skip sending the CSI report.

Optionally, the method further includes:

When the first time interval is less than the first delay coefficient, the terminal device determines that an uplink transmission resource for the CSI report triggered by the downlink control information is used to transmit HARQ information or a transport block; or when the second time interval is less than the second delay coefficient, the terminal device determines that the downlink control information triggers a plurality of CSI reports, or an uplink transmission resource for the CSI report triggered by the downlink control information is used to transmit HARQ information or a transport block; and the terminal device sends a CSI report that is not updated.

In other words, if the first time interval is less than the first delay coefficient, and the downlink control information triggers one or more CSI reports, the terminal device may send the CSI report that is not updated.

Alternatively, if the second time interval is less than the second delay coefficient, and the downlink control information triggers the plurality of CSI reports, the terminal device may send the CSI report that is not updated.

Alternatively, if the second time interval is less than the second delay coefficient, and the uplink transmission resource for the CSI reporting is used to transmit the HARQ information or uplink data, the terminal device may send the CSI report that is not updated.

Optionally, the CSI report carries a predefined value, and the predefined value is used to indicate that the CSI report is a CSI report that is not updated.

It should be understood that, for a step performed by the terminal device when the first time interval is less than the first delay coefficient or the second time interval is less than the second delay coefficient, refer to the conventional technology. For brevity, this is not limited herein.

Based on the technical solution described above, through extension of the delay coefficients $Z_2$ and $Z_2'$, in the case of different configuration parameters of the network device, the terminal device may determine, based on different delay coefficients, a manner of processing the CSI report triggered by the downlink control information. This may fit better with a type II codebook. When performing PMI measurement and reporting based on the type II codebook, the terminal device may have a longer processing time, thereby helping obtain more accurate PMI feedback, and helping improve data transmission performance.

Figure 6:
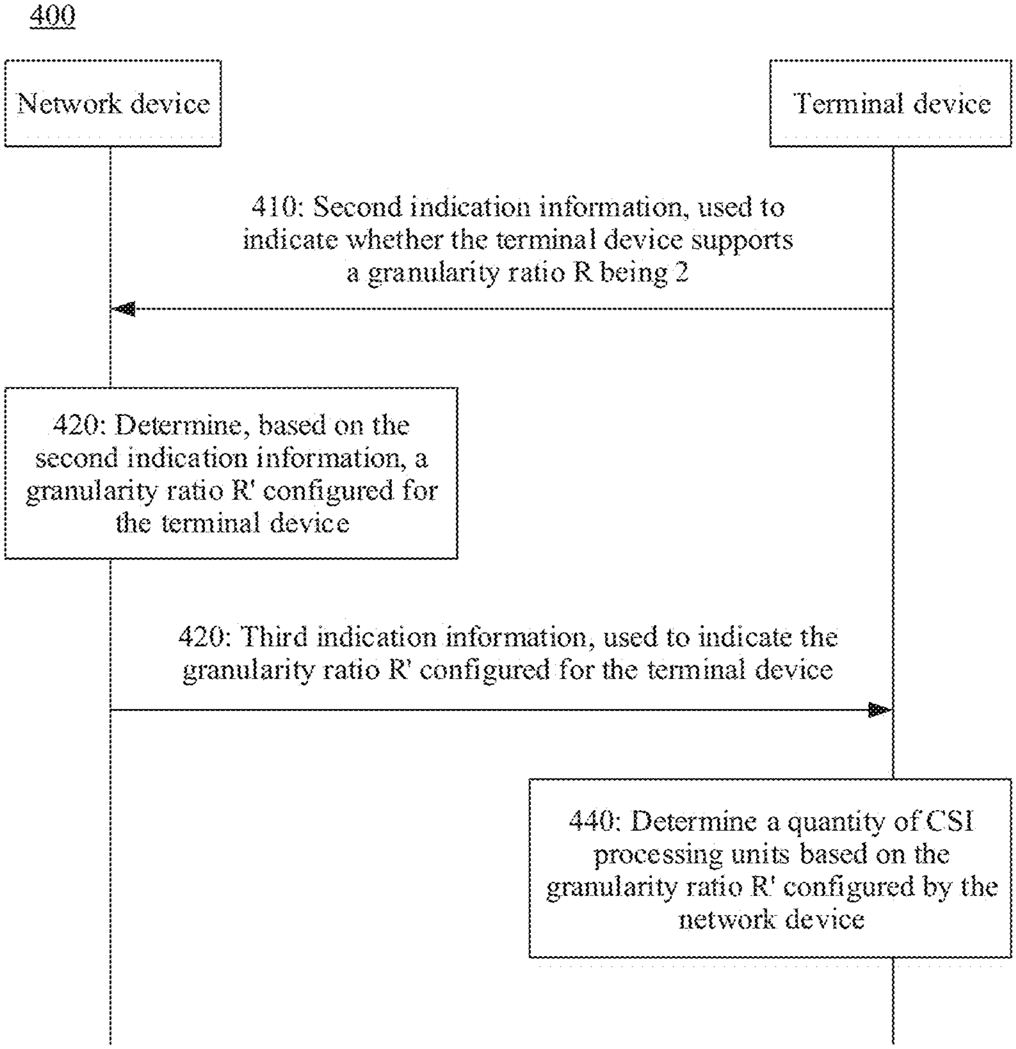
FIG. 6 is a schematic flowchart of a method for reporting a terminal device capability according to still another embodiment of this application.

FIG. 6 is a schematic flowchart of a method 400 according to another embodiment of this application from a perspective of device interaction. As shown in the figure, the method 400 may include step 410 to step 430. The following describes the steps in the method 400 in detail.

Step 410: A terminal device sends second indication information, where the second indication information is used to indicate whether the terminal device supports a granularity ratio R being 2. Correspondingly, a network device receives the second indication information.

To enable the network device to obtain a CSI processing capability of the terminal device, and enable the network device to perform corresponding scheduling based on the CSI processing capability of the terminal device, a CSI processing unit (CSI processing unit, CPU) is defined in an NR protocol. Quantities of CSI processing units occupied by each CSI report in different configurations are also defined. When the terminal device performs PMI measurement and reporting based on a type II codebook, a reference signal resource set bound to each CSI reporting configuration includes K reference signal resources (an existing protocol specifies that when PMI measurement and reporting are performed based on the type II codebook, each reference signal resource set includes one reference resource, that is, K=1). When the CSI reporting configuration is triggered, the reporting configuration occupies K CSI processing units. However, if a granularity ratio R' configured by the network device for the terminal device is greater than 1, a quantity of CSI processing units occupied by the CSI reporting configuration may be doubled. For example, R'×K CSI processing units are occupied.

For example, when one CSI report is triggered for the UE, one reference signal resource set (for example, a CSI-RS resource set) is bound to the CSI reporting for channel measurement, and the reference signal resource set includes one (that is, K=1) reference signal resource (for example, a CSI-RS resource). If R'=1, the CSI reporting occupies one CSI processing unit; or if R'=2, the CSI reporting occupies two CSI processing units.

Therefore, the terminal device may report, to the network device, whether R being 2 is supported.

As described in an implementation of the foregoing method 200, whether the terminal device supports the granularity ratio R being 2 may be understood as a parameter used to indicate the maximum quantity N of first frequency domain units that can be supported by the terminal device, or a parameter that may be used to indicate a frequency domain parameter. It should be understood that, the terminal device may also report, by reporting a value of R that can be supported by the terminal device, whether the granularity ratio R being 2 is supported. A specific implementation of reporting, by the terminal device, whether the granularity ratio R being 2 is supported is not limited in this application.

It should be understood that, in some implementations of the foregoing method 200, the first indication information may also be used to indicate whether the terminal device supports the granularity ratio R being 2, or used to indicate the granularity ratio R supported by the terminal device. In this case, the second indication information and the first indication information may be same indication information.

Step 420: The network device determines, based on the second indication information, a granularity ratio R' configured for the terminal device.

The network device may determine, based on the second indication information reported by the terminal device, whether the terminal device supports the granularity ratio R being 2, and further configure the granularity ratio R' for the terminal device. The granularity ratio R' configured by the network device for the terminal device may be a value less than or equal to R. For example, if the terminal device supports R being 2, R' is 1 or 2. If the terminal device does not support R being 2, R' is 1.

Step 430: The network device sends third indication information, where the third indication information is used to indicate the granularity ratio configured by the network device. Correspondingly, the terminal device receives the third indication information.

The network device may configure the granularity ratio R' for the terminal device by using the third indication information. The network device may include the third indication information in higher layer signaling, for example, an RRC message. Signaling for carrying the third indication information is not limited in this application.

Step 440: The terminal device determines a CSI processing unit based on the granularity ratio configured by the network device.

The terminal device may determine, based on the granularity ratio R' configured by the network device, a quantity of CSI processing units that need to be allocated to the terminal device for CSI processing.

Specifically, the terminal device may determine a required quantity of CSI processing units based on the reference signal resource quantity included in the reference signal resource set bound to the CSI reporting configuration and the granularity ratio R' configured by the network device. A relationship among the quantity of CSI processing units, the reference signal resource quantity, and R' has been described in detail in step 410. For brevity, details are not described herein again.

Based on the technical solution described above, capability information indicating whether the terminal device supports R being 2 is reported to the network device, so that the network device may configure a plurality of possible granularity ratios for the terminal device. The terminal device may determine different quantities of CSI processing units based on different granularity ratios that are configured by the network device, to perform PMI measurement and reporting. Therefore, the granularity ratio configured by the network device can fall within a range of a capability of the terminal device. When the granularity ratio R' configured by the network device is 2, the terminal device may configure more computing resources for PMI measurement and reporting, thereby helping accurately and rapidly obtain a PMI for reporting. Therefore, it helps improve data transmission performance.

It should be understood that, sequence numbers of the processes do not mean execution sequences in the foregoing embodiments. The execution sequences of the processes should be determined based on functions and internal logic of the processes, and shall not constitute any limitation on the implementation processes in the embodiments of this application.

It should be further understood that, the embodiments of the method 200, the method 300, and the method 400 shown above may be used in combination. This is not limited in this application. For example, the steps in the method 300 may be performed after step 230 in the method 200. For another example, step 410 in the method 400 may be step 210 in the method 200, and step 420 to step 440 may be performed after step 210 in the method 200.

The foregoing describes in detail the methods provided in the embodiments of this application with reference to FIG. 4 to FIG. 6. The following describes in detail apparatuses provided in embodiments of this application with reference to FIG. 7 to FIG. 9.

Figure 7:
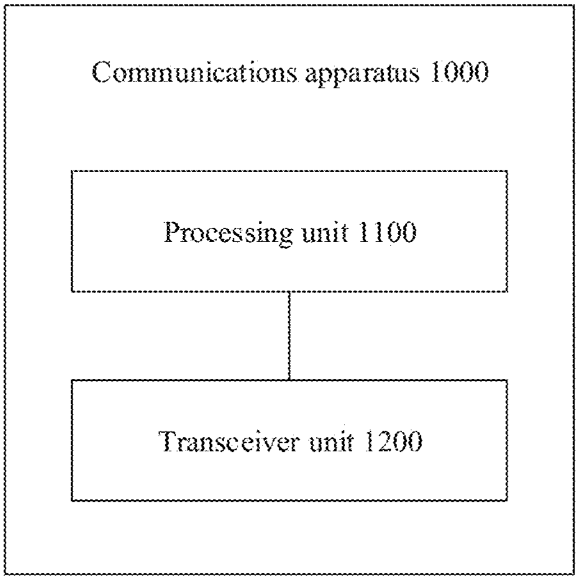
FIG. 7 is a schematic block diagram of a communications apparatus according to an embodiment of this application.

FIG. 7 is a schematic block diagram of a communications apparatus according to an embodiment of this application. As shown in FIG. 7, the communications apparatus 1000 may include a processing unit 1100 and a transceiver unit 1200.

In a possible design, the communications apparatus 1000 may correspond to the terminal device in the foregoing method embodiments, for example, may be the terminal device, or may be a chip disposed in the terminal device.

Specifically, the communications apparatus 1000 may correspond to the terminal device in the method 200, the method 300, or the method 400 according to the embodiments of this application. The communications apparatus 1000 may include units configured to perform the method performed by the terminal device in the method 200 in FIG. 4, the method 300 in FIG. 5, or the method 400 in FIG. 6. In addition, the units in the communications apparatus 1000 and the foregoing other operations and/or functions are separately intended to implement corresponding procedures of the method 200 in FIG. 4, the method 300 in FIG. 5, or the method 400 in FIG. 6.

When the communications apparatus 1000 is configured to perform the method 200 in FIG. 4, the processing unit 1100 may be configured to perform step 210 in the method 200, and the transceiver unit 1200 may be configured to perform step 220 in the method 200. It should be understood that, a specific process of performing a corresponding step by each unit has been described in detail in the foregoing method embodiments. For brevity, details are not described herein again.

When the communications apparatus 1000 is configured to perform the method 300 in FIG. 5, the processing unit 1100 may be configured to perform step 320 in the method 300, and the transceiver unit 1200 may be configured to perform step 310 and step 330 in the method 300. It should be understood that, a specific process of performing a corresponding step by each unit has been described in detail in the foregoing method embodiments. For brevity, details are not described herein again.

When the communications apparatus 1000 is configured to perform the method 400 in FIG. 6, the processing unit 1100 may be configured to perform step 430 in the method 400, and the transceiver unit 1200 may be configured to perform step 410 and step 420 in the method 400. It should be understood that, a specific process of performing a corresponding step by each unit has been described in detail in the foregoing method embodiments. For brevity, details are not described herein again.

Figure 8:
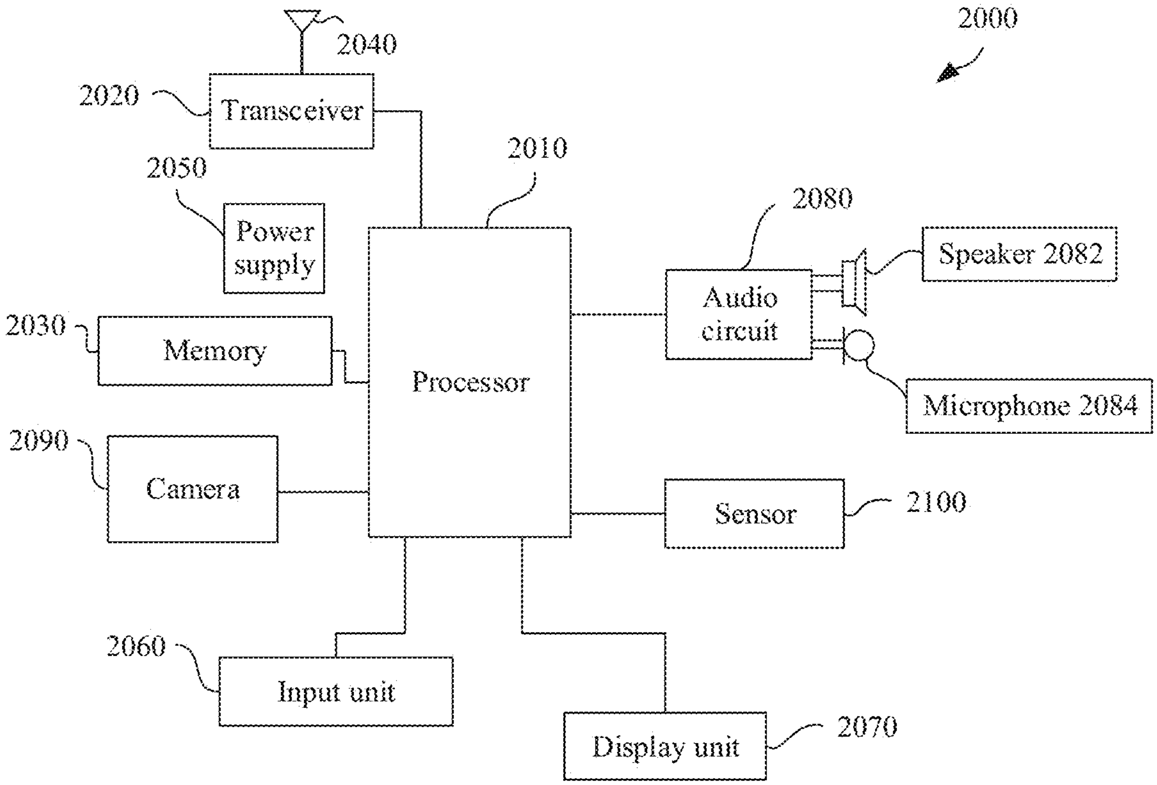
FIG. 8 is a schematic structural diagram of a terminal device according to an embodiment of this application.

It should be further understood that when the communications apparatus 1000 is the terminal device, the transceiver unit 1200 in the communications apparatus 1000 may correspond to a transceiver 2020 in a terminal device 2000 shown in FIG. 8, and the processing unit 1100 in the communications apparatus 1000 may correspond to a processor 2010 in the terminal device 2000 shown in FIG. 8.

It should be further understood that when the communications apparatus 1000 is the chip disposed in the terminal device, the transceiver unit 1200 in the communications apparatus 1000 may be an input/output interface.

In another possible design, the communications apparatus 1000 may correspond to the network device in the foregoing method embodiments, for example, may be the network device, or a chip disposed in the network device.

Specifically, the communications apparatus 1000 may correspond to the network device in the method 200, the method 300, or the method 400 according to the embodiments of this application. The communications apparatus 1000 may include units configured to perform the method performed by the network device in the method 200 in FIG. 4, the method 300 in FIG. 5, or the method 400 in FIG. 6. In addition, the units in the communications apparatus 1000 and the foregoing other operations and/or functions are separately intended to implement corresponding procedures of the method 200 in FIG. 4, the method 300 in FIG. 5, or the method 400 in FIG. 6.

When the communications apparatus 1000 is configured to perform the method 200 in FIG. 4, the processing unit 1100 may be configured to perform step 230 in the method 200, and the transceiver unit 1200 may be configured to perform step 220 in the method 200. It should be understood that, a specific process of performing a corresponding step by each unit has been described in detail in the foregoing method embodiments. For brevity, details are not described herein again.

When the communications apparatus 1000 is configured to perform the method 300 in FIG. 5, the processing unit 1100 may be configured to generate downlink control information, where the downlink control information is used to trigger CSI reporting, and the transceiver unit 1200 may be configured to perform step 310 and step 330 in the method 300. It should be understood that, a specific process of performing a corresponding step by each unit has been described in detail in the foregoing method embodiments. For brevity, details are not described herein again.

When the communications apparatus 1000 is configured to perform the method 400 in FIG. 6, the processing unit 1100 may be configured to generate third indication information, where the third indication information is used to indicate a granularity ratio configured for the terminal device, and the transceiver unit 1200 may be configured to perform step 410 and step 420 in the method 400. It should be understood that, a specific process of performing a corresponding step by each unit has been described in detail in the foregoing method embodiments. For brevity, details are not described herein again.

Figure 9:
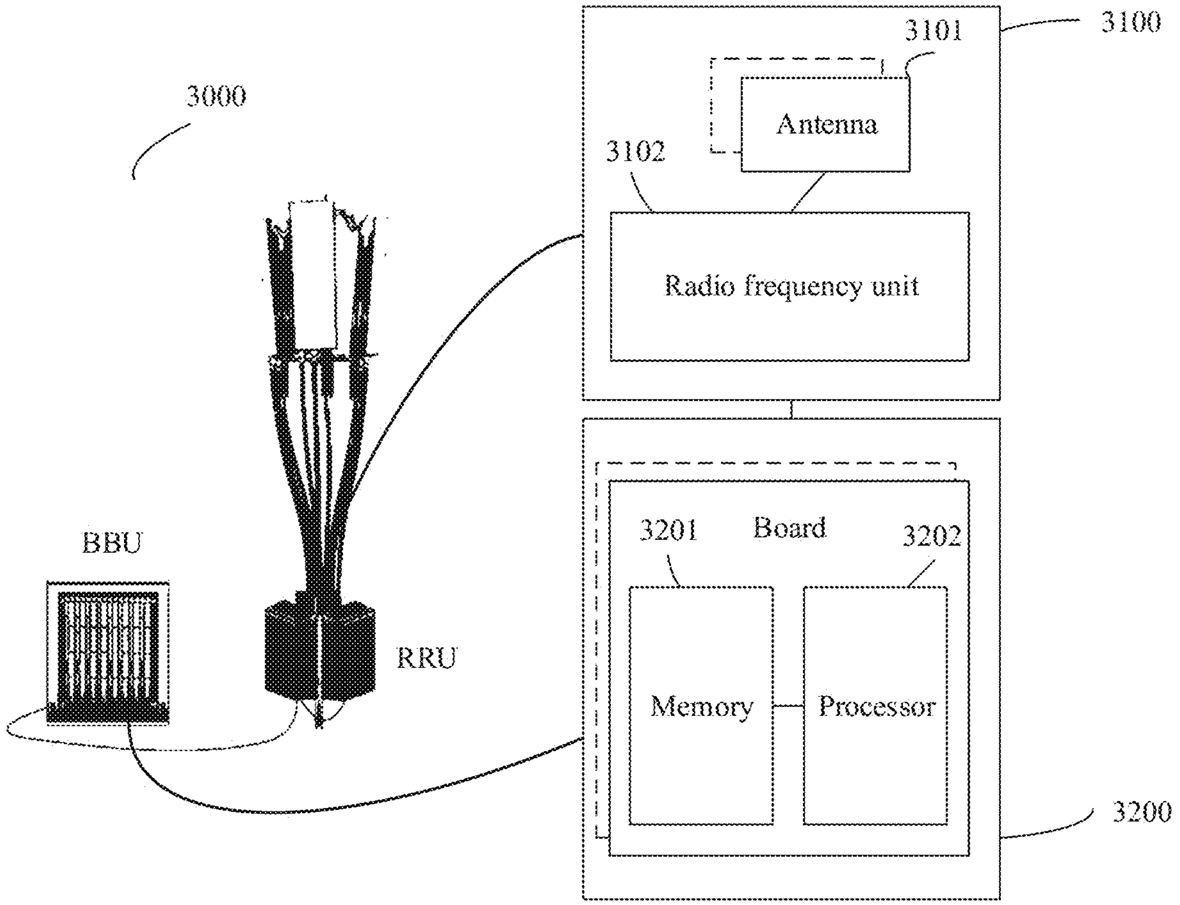
FIG. 9 is a schematic structural diagram of a network device according to an embodiment of this application.

It should be further understood that when the communications apparatus 1000 is the network device, the transceiver unit in the communications apparatus 1000 may correspond to a transceiver 3200 in a network device 3000 shown in FIG. 9, and the processing unit 1100 in the communications apparatus 1000 may correspond to a processor 3100 in the network device 3000 shown in FIG. 9.

It should be further understood that when the communications apparatus 1000 is the chip disposed in the network device, the transceiver unit 1200 in the communications apparatus 1000 may be an input/output interface.

FIG. 8 is a schematic structural diagram of a terminal device 2000 according to an embodiment of this application. The terminal device 2000 may be applied to the system shown in FIG. 1, to perform functions of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to receive or send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may also be integrated into the processor 2010, or may be independent of the processor 2010. The processor 2010 may correspond to the processing unit in FIG. 7.

The transceiver 2020 may correspond to the transceiver unit in FIG. 7, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that, the terminal device 2000 shown in FIG. 8 can implement the processes of the terminal device in the method embodiment shown in FIG. 4, FIG. 5, or FIG. 6. Operations and/or functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050, configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 9 is a schematic structural diagram of a network device according to an embodiment of this application, for example, may be a schematic structural diagram of a base station. The base station 3000 may be applied to the system shown in FIG. 1, to perform functions of the network device in the foregoing method embodiments. As shown in the figure, the base station 3000 may include one or more radio frequency units, for example, one or more remote radio units (remote radio unit, RRU) 3100, and one or more baseband units (BBU) (which may also be referred to as distributed units (DU)) 3200. The RRU 3100 may be referred to as a transceiver unit, and corresponds to the transceiver unit 1100 in FIG. 7. Optionally, the transceiver unit 3100 may also be referred to as a transceiver, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to: receive and send a radio frequency signal, and perform conversion between the radio frequency signal and a baseband signal. For example, the RRU 3100 is configured to send indication information to a terminal device. The BBU 3200 is mainly configured to: perform baseband processing, control the base station, and so on. The RRU 3100 and the BBU 3200 may be physically disposed together, or may be physically disposed separately; to be specific, the base station is a distributed base station.

The BBU 3200 is a control center of the base station, and may be referred to as a processing unit, may correspond to the processing unit 1200 in FIG. 7, and is mainly configured to implement a baseband processing function, for example, channel encoding, multiplexing, modulation, or frequency spread. For example, the BBU (the processing unit) may be configured to control the base station to perform an operation procedure related to the network device in the foregoing method embodiments, for example, to generate the foregoing indication information.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store necessary instructions and necessary data. The processor 3202 is configured to control the base station to perform a necessary action, for example, configured to control the base station to perform an operation procedure related to the network device in the foregoing method embodiments. The memory 3201 and the processor 3202 may serve one or more boards. To be specific, a memory and a processor may be separately disposed on each board. Alternatively, a plurality of boards may share a same memory and a same processor. In addition, a necessary circuit may be further disposed on each board.

It should be understood that, the base station 3000 shown in FIG. 9 can implement the processes of the network device in the method embodiment shown in FIG. 4, FIG. 5, or FIG. 6. Operations and/or functions of the modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

It should be understood that, the base station 3000 shown in FIG. 9 is merely a possible architecture of the network device, and shall not constitute any limitation on this application. The method provided in this application is applicable to a network device of another architecture, for example, a network device including a CU, a DU, and an active antenna unit (active antenna unit, AAU). A specific architecture of the network device is not limited in this application.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (field programmable gate array, FPGA), an application-specific integrated circuit (application specific integrated circuit, ASIC), a system on chip (system on chip, SoC), a central processing unit (central processor unit, CPU), a network processor (network processor, NP), a digital signal processing circuit (digital signal processor, DSP), a micro controller unit (micro controller unit, MCU), a programmable controller (programmable logic device, PLD), or another integrated chip.

In an implementation process, the steps in the foregoing methods may be implemented by using a hardware integrated logic circuit in the processor, or by using instructions in a form of software. The steps of the methods disclosed with reference to the embodiments of this application may be directly performed and completed by using a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by using a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memories in the systems and method described in this specification include but are not limited to these memories and any memory of another suitable type.

According to the methods provided in the embodiments of this application, this application further provides a computer program product. The computer program product includes computer program code. When the computer program code is run on a computer, the computer is enabled to perform the method in the embodiment shown in FIG. 4, FIG. 5, or FIG. 6.

According to the methods provided in the embodiments of this application, this application further provides a computer-readable medium. The computer-readable medium stores program code. When the program code is run on a computer, the computer is enabled to perform the method in the embodiment shown in FIG. 4, FIG. 5, or FIG. 6.

According to the methods provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state disc (solid state disc, SSD)), or the like.

The network device and the terminal device in the foregoing apparatus embodiments completely correspond to the network device and the terminal device in the method embodiments. A corresponding module or unit performs a corresponding step. For example, the communications unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

A person of ordinary skill in the art may be aware that, various illustrative logical blocks (illustrative logical block) and steps (step) that are described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that, the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

In the foregoing embodiments, all or some of functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid state disk, SSD)), or the like.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications method, comprising:

receiving first indication information from a terminal device, wherein the first indication information indicates one or more frequency domain parameters and indicates the following capability parameters associated with each of the one or more of frequency domain parameters: a port quantity, a reference signal resource quantity, and a total port quantity; each of the one or more frequency domain parameters and one or more capability parameters associated with the respective frequency domain parameter indicate one combination of a plurality of parameters simultaneously supported by a terminal device; each of the one or more of the frequency domain parameters indicates a maximum quantity of first frequency domain units that is supported by the terminal device; each of the first frequency domain units is a frequency domain unit based on which the terminal device reports a precoding matrix indicator (PMI); the port quantity is a maximum quantity of ports in one reference signal resource; the reference signal resource quantity is a maximum quantity of reference signal resources; and the total port quantity indicates a total quantity of ports in all reference signal resources; and determining, based on the first indication information, the capability parameter supported by the terminal device.

2. The method according to claim 1, wherein the capability parameters comprise a spatial domain parameter, and the first indication information further indicates the spatial domain parameter, and the first indication information indicates one or more first capability parameter groups and one or more second capability parameter groups; each of the one or more first capability parameter groups comprises one frequency domain parameter and one spatial domain parameter associated with the frequency domain parameter; each of the one or more second capability parameter groups comprises one port quantity, one reference signal resource quantity, and one total port quantity; each of the one or more first capability parameter groups is associated with at least one second capability parameter group; and a plurality of capability parameters in a same first capability parameter group are associated, and a plurality of capability parameters in a same second capability parameter group are associated;

wherein the spatial domain parameter indicates a maximum quantity of spatial domain vectors that are used for codebook generation.

3. The method according to claim 1, wherein the first indication information indicates the maximum quantity N of first frequency domain units that is supported by the terminal device, to indicate the frequency domain parameter, and N is a positive integer.

4. The method according to claim 1, wherein the first indication information indicates a maximum value of a granularity ratio R supported by the terminal device, to indicate the frequency domain parameter, and the granularity ratio R indicates a preconfigured ratio of a granularity of a second frequency domain unit to a granularity of the first frequency domain unit, and R is a positive number.

5. The method according to claim 1, wherein the first indication information indicates whether the terminal device supports a granularity ratio R being 2, to indicate the frequency domain parameter, and the granularity ratio R indicates a preconfigured ratio of a granularity of a second frequency domain unit to a granularity of the first frequency domain unit.

6. The method according to claim 4, wherein the first indication information indicates a maximum quantity of second frequency domain units that is supported by the terminal device, to indicate the frequency domain parameter.

7. A communications apparatus, comprising: at least one processor, and one or more memories coupled to the at least one processor and storing programming instructions for execution by the at least one processor to perform operations comprising:

receiving first indication information from a terminal device, wherein the first indication information indicates one or more frequency domain parameters and indicates the following capability parameters associated with each of the one or more of frequency domain parameters: a port quantity, a reference signal resource quantity, and a total port quantity; each of the one or more frequency domain parameters and one or more capability parameters associated with the respective frequency domain parameter indicate one combination of a plurality of parameters simultaneously supported by a terminal device; each of the one or more of the frequency domain parameters indicates a maximum quantity of first frequency domain units that is supported by the terminal device; each of the first frequency domain units is a frequency domain unit based on which the terminal device reports a precoding matrix indicator (PMI); the port quantity is a maximum quantity of ports in one reference signal resource; the reference signal resource quantity is a maximum quantity of reference signal resources; and the total port quantity indicates a total quantity of ports in all reference signal resources; and determining, based on the first indication information, the capability parameter supported by the terminal device.

8. The apparatus according to claim 7, wherein the capability parameters comprise a spatial domain parameter, and the first indication information further indicates the spatial domain parameter, and the first indication information indicates one or more first capability parameter groups and one or more second capability parameter groups; each of the one or more first capability parameter groups comprises one frequency domain parameter and one spatial domain parameter associated with the frequency domain parameter; each of the one or more second capability parameter groups comprises one port quantity, one reference signal resource quantity, and one total port quantity; each of the one or more first capability parameter groups is associated with at least one second capability parameter group; and a plurality of capability parameters in a same first capability parameter group are associated, and a plurality of capability parameters in a same second capability parameter group are associated;

wherein the spatial domain parameter indicates a maximum quantity of spatial domain vectors that are used for codebook generation.

9. The apparatus according to claim 7, the first indication information indicates the maximum quantity N of first frequency domain units that is supported by the terminal device, to indicate the frequency domain parameter, and N is a positive integer.

10. The apparatus according to claim 7, wherein the first indication information indicates a maximum value of a granularity ratio R supported by the terminal device, to indicate the frequency domain parameter, and the granularity ratio R indicates a preconfigured ratio of a granularity of a second frequency domain unit to a granularity of the first frequency domain unit, and R is a positive number.

11. The apparatus according to claim 7, wherein the first indication information indicates whether the terminal device supports a granularity ratio R being 2, to indicate the frequency domain parameter, and the granularity ratio R indicates a preconfigured ratio of a granularity of a second frequency domain unit to a granularity of the first frequency domain unit.

12. The apparatus according to claim 10, wherein the first indication information further indicates a maximum quantity of second frequency domain units that is supported by the terminal device, to indicate the frequency domain parameter.

13. The apparatus according to claim 7, wherein the apparatus is a network device or a chip.

14. A non-transitory computer-readable storage medium, comprising a computer program, wherein when the computer program is run on a computer, the computer is enabled to perform:

receiving first indication information from a terminal device, wherein the first indication information indicates one or more frequency domain parameters and indicates the following capability parameters associated with each of the one or more of frequency domain parameters: a port quantity, a reference signal resource quantity, and a total port quantity; each of the one or more frequency domain parameters and one or more capability parameters associated with the respective frequency domain parameter indicate one combination of a plurality of parameters simultaneously supported by a terminal device; each of the one or more of the frequency domain parameters indicates a maximum quantity of first frequency domain units that is supported by the terminal device; each of the first frequency domain units is a frequency domain unit based on which the terminal device reports a precoding matrix indicator (PMI); the port quantity is a maximum quantity of ports in one reference signal resource; the reference signal resource quantity is a maximum quantity of reference signal resources; and the total port quantity indicates a total quantity of ports in all reference signal resources; and determining, based on the first indication information, the capability parameter supported by the terminal device.

15. The non-transitory computer-readable storage medium according to claim 14, wherein the capability parameters comprise a spatial domain parameter, and the first indication information further indicates the spatial domain parameter, and the first indication information indicates one or more first capability parameter groups and one or more second capability parameter groups; each of the one or more first capability parameter groups comprises one frequency domain parameter and one spatial domain parameter associated with the frequency domain parameter; each of the one or more second capability parameter groups comprises one port quantity, one reference signal resource quantity, and one total port quantity; each of the one or more first capability parameter groups is associated with at least one second capability parameter group; and a plurality of capability parameters in a same first capability parameter group are associated, and a plurality of capability parameters in a same second capability parameter group are associated;

wherein the spatial domain parameter indicates a maximum quantity of spatial domain vectors that are used for codebook generation.

16. The non-transitory computer-readable storage medium according to claim 14, wherein the first indication information indicates the maximum quantity N of first frequency domain units that is supported by the terminal device, to indicate the frequency domain parameter, and N is a positive integer.

17. The non-transitory computer-readable storage medium according to claim 14, wherein the first indication information indicates a maximum value of a granularity ratio R supported by the terminal device, to indicate the frequency domain parameter, and the granularity ratio R indicates a preconfigured ratio of a granularity of a second frequency domain unit to a granularity of the first frequency domain unit, and R is a positive number.

18. The non-transitory computer-readable storage medium according to claim 14, wherein the first indication information indicates whether the terminal device supports a granularity ratio R being 2, to indicate the frequency domain parameter, and the granularity ratio R indicates a preconfigured ratio of a granularity of a second frequency domain unit to a granularity of the first frequency domain unit.

19. The non-transitory computer-readable storage medium according to claim 17, wherein the first indication information further indicates a maximum quantity of second frequency domain units that is supported by the terminal device, to indicate the frequency domain parameter.

* * * * *